(12) United States Patent
Barrueto

(10) Patent No.: US 10,291,690 B1
(45) Date of Patent: May 14, 2019

(54) HETEROGENEOUS DEVICE COMMUNICATION SYSTEM

(71) Applicant: Activity Monitoring Technologies S.A. de C.V., San Pedro Garza García, N.L. (MX)

(72) Inventor: Carlos Arteaga Barrueto, Irvine, CA (US)

(73) Assignee: Activity Monitoring Technologies S.A. de C.V., San Pedro Garza Garcia (MX)

( * ) Notice: Subject to any disclaimer, the term of this patent is extended or adjusted under 35 U.S.C. 154(b) by 308 days.

(21) Appl. No.: 15/216,555

(22) Filed: Jul. 21, 2016

Related U.S. Application Data

(60) Provisional application No. 62/195,609, filed on Jul. 22, 2015.

(51) Int. Cl.
*H04L 29/08* (2006.01)
*H04L 12/24* (2006.01)

(52) U.S. Cl.
CPC .............. *H04L 67/10* (2013.01); *H04L 41/12* (2013.01)

(58) Field of Classification Search
CPC .................................. H04L 67/10; H04L 41/12
See application file for complete search history.

(56) References Cited

U.S. PATENT DOCUMENTS

| 2015/0019710 A1* | 1/2015 | Shaashua | H04W 4/70 709/224 |
| 2015/0381776 A1* | 12/2015 | Seed | H04W 4/70 709/203 |

* cited by examiner

*Primary Examiner* — June Y Sison
(74) *Attorney, Agent, or Firm* — Knobbe, Martens, Olson & Bear, LLP

(57) ABSTRACT

A heterogeneous communication system is presented that enables different devices or sensors to communicate within an Internet of Things (IoT) environment. The heterogeneous communication system can include a protocol layer that enables the heterogeneous communication system to convert observations, or data associated with a semantic, from one format to another format that can be processed by an intended recipient system. Further, the heterogeneous communication system can support multiple communication technologies enabling a diversity of devices or sensors to be integrated within a single IoT implementation without an end user creating any application-specific communication software for the network or limiting the selection of devices within the network.

20 Claims, 22 Drawing Sheets

2000 ⇘

```
{
   "proximityarea": "",
   "eddystoneTlmAdvCnt": 0,
   "guestusers": [],                               ——— 2006
   "targetthings": "[]",                           ——— 2004
   "location": "",
   "eddystoneTlmVbatt": 0,
   "eddystoneTlmSecCnt": 0,
   "lastSeenByBLEHub": "2016-02-21T18:39:21.000Z",
   "eddystoneType": "uid",
   "eddystoneNamespace": "0123456789",
   "eddystoneInstance": "123456",
   "eddystoneTlmVersion": "0",
   "smoothingResult": "new",
   "description": "",
   "topic": "m2mBridgeTest/bleScanner/eddystone/new",
   "beaconRssi": 1,
   "@type": "/amtech/linkeddata/types/composite/observation/
eddystoneBrodcast",                                ——— 2002
   "beaconTxPower": 1,
   "beaconDistance": 0,
   "creationDate": "2016-03-24T20:53:47.369Z",
   "guesttenants": [],                             ——— 2012
   "eddystoneUrl": "",
   "eddystoneTlmTemperature": 0,                   ——— 2008
   "producer": "eddystone",
   "detectiontime": "2016-03-04T18:37:31.000Z",    ——— 2010
   "occurrencetime": "2016-03-04T18:37:31.000Z",
   "@id": "/amtech/things/observations/eddystoneBroadcast"
}
```

FIG. 20

HETEROGENEOUS DEVICE COMMUNICATION SYSTEM

INCORPORATION BY REFERENCE TO ANY PRIORITY APPLICATIONS

This application claims priority to U.S. Provisional Application No. 62/195,609, filed on Jul. 22, 2015 and titled "RESOURCES, DOMAIN APPLICATION PROTOCOL AND DEFINITION AND CONFIGURATION SYSTEM, TO ENABLE A USER TO CREATE A NETWORK OF STANDARD-BASED, MACHINE-READABLE DATA FOR CREATING INTERNET OF THINGS (IOT) SOLUTIONS," the disclosure of which is incorporated by reference in its entirety herein.

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

Many computing devices communicate over networks. However, it is not just traditional computing devices, such as desktop and laptop computers that can communicate over a network. Today, many other devices can communicate information over a network. Moreover, as computing devices decrease in price, many devices that previously did not include computing functionality or network communication functionality can now perform computing tasks or communication over a network.

There exist a number of technologies that enable network communication. For example, computing devices can communicate using wired technology or wireless technology. Further, there are a number of wireless technologies that can be used by device to communicate over a network.

SUMMARY

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain embodiments of the present disclosure relate to a heterogeneous computing gateway. The heterogeneous computing gateway may include a plurality of communication devices including a first communication device and a second communication device. The first communication device may be of a different device type than the second communication device. Further, the heterogeneous computing gateway may include a storage device programmed to store a protocol layer. This protocol layer may comprise a plurality of communication interfaces for interacting with a plurality of heterogeneous devices. The plurality of heterogeneous devices can comprise a plurality of sensor devices. The heterogeneous computing gateway may further include a hardware processor programmed to access an observation from a first sensor device at one of the first communication device or the second communication device. The first sensor device may be one of the plurality of sensor devices. Further, the first sensor device may be used to measure one or more characteristics of a first entity environment. At least some of the sensor devices may be located at a second entity environment and the observation may comprise a data item associated with a particular semantic. The hardware processor may be further programmed to determine a type of the first sensor device using the protocol layer. In addition, the hardware processor may be programmed to translate the observation from a format associated with the type of the first sensor device to a format associated with an observer system using the protocol layer. The observer system may be implemented on computer hardware that is separate from the heterogeneous communication gateway. Moreover, the hardware processor may be programmed to transmit the translated data to the observer system over a wide area network.

In certain embodiments, the hardware processor is further programmed to translate the observation by identifying semantic rules for the observer system and translating the observation using the semantic rules for the observer system to the format associated with the observer system. Further, the heterogeneous devices may comprise a plurality of configurable devices. In some implementations, the hardware processor is further programmed to receive a command from an actor to be performed at a configurable device. The configurable device may be included in the plurality of heterogeneous devices. The hardware processor may be further programmed to determine whether the actor is authorized to access the configurable device and in response to determining that the actor is not authorized to access the configurable device, prevent the command from being transmitted to the configurable device.

Moreover, the hardware processor may be further programmed to determine whether the actor is authorized to access the configurable device by determining an entity associated with the actor and determining whether the entity is authorized to access the configurable device. In addition, the hardware processor may determine whether the actor is authorized to access the configurable device on behalf of the entity. In response to determining that the actor is authorized to access the configurable device, the hardware processor may be further programmed to determine the type of the configurable device. Furthermore, the hardware processor may be programmed to identify semantic rules for the configurable device based at least in part on the type of the configurable device. Moreover, the hardware processor may be programmed to format the command using the semantic rules for the configurable device and transmit the command to the configurable device. In some embodiments, the actor comprises another configurable device from the plurality of heterogeneous devices.

In addition, certain embodiments of the present disclosure relate to a heterogeneous communication network. The heterogeneous communication network may include a plurality of heterogeneous devices, a heterogeneous communication gateway, and a heterogeneous communication system. At least some of the plurality of heterogeneous devices may be configured to communicate over a network. A first device from the plurality of heterogeneous devices can communicate using a first communication protocol and a second device from the plurality of heterogeneous devices can communicate using a second communication protocol differing from the first communication protocol. The heterogeneous communication gateway may comprise a first hardware processor and a plurality of communication devices. A first communication device from the plurality of communication devices may be capable of communication using the first communication protocol and a second communication device from the plurality of communication devices may be capable of communication using the second communication protocol. The first hardware processor can be programmed to execute a protocol layer for enabling communication among heterogeneous devices. The protocol layer can provide rules for converting observations accessed from the first device for consumption by the second device. The heterogeneous communication system may comprise an observer system programmed to monitor one or more communications from at least some of the plurality of heterogeneous devices and a data processing engine comprising a second hardware processor programmed to initiate an action in response to a trigger generated by the observer system.

In some implementations, at least some of the plurality of heterogeneous devices may be located at a first entity environment and at least some other of the plurality of heterogeneous devices may be located at a second entity environment. In some cases, the heterogeneous communication system is located at a different geographic location than the plurality of heterogeneous devices.

In certain embodiments, the first hardware processor of the heterogeneous communication gateway is further configured to access an observation from the first device and access a set of semantic rules of the second device from the protocol layer. Moreover, the first hardware processor is further configured to convert the observation from the first device for consumption by the second device using the set of semantic rules and to provide the converted observation to the second device. In some implementations, the protocol layer is a dynamic protocol layer that may be updated without ceasing operation of the heterogeneous communication gateway.

In some embodiments, the protocol layer is modified at the heterogeneous communication system. In some such cases, the heterogeneous communication system distributes the modified protocol layer to one or more heterogeneous communication gateways over a wide area network. The one or more heterogeneous communication gateways may include the heterogeneous communication gateway. Further, at least one of the plurality of heterogeneous devices may comprise one or more sensors configured to measure one or more characteristics of an entity environment. Moreover, the heterogeneous communication system may further comprise a sensor network system programmed to aggregate observations received via a wide area network. At least some of the observations may be received from the one or more sensors. In addition, the observer system can generate the trigger in response to determining that at least one observation aggregated by the sensor network system exceeds a threshold associated with the observation.

In some implementations, in response to the trigger, the data processing engine is further programmed to identify the action to execute in response to the trigger, identify a device from the plurality of heterogeneous devices to receive a command to execute the action, and transmit the command to the device. Further, in some embodiments, the data processing engine is further programmed to access a copy of the protocol layer stored at the heterogeneous communication system, determine a set of semantic rules for the device from the copy of the protocol layer, and format the command based at least in part on the set of semantic rules. In addition, the data processing engine can transmit the command by transmitting the formatted command to the device.

In some embodiments, the data processing engine transmits the command to the device by transmitting the command to the heterogeneous communication gateway that transmits the command to the device. Moreover, the heterogeneous communication gateway may be further programmed to determine a set of semantic rules for the device from the protocol layer and format the command based at least in part on the set of semantic rules. In some cases, the heterogeneous communication gateway transmits the command by transmitting the formatted command to the device.

In some implementations, the heterogeneous communication gateway is one of a plurality of heterogeneous communication gateways. At least some of the heterogeneous communication gateways may communicate with a first set of heterogeneous devices from the plurality of heterogeneous devices and at least some other of the heterogeneous communication gateways may communicate with a second set of heterogeneous devices from the plurality of heterogeneous devices that differs from the first set of heterogeneous devices. With some implementations, at least some of the heterogeneous communication gateways and the first set of heterogeneous devices are associated with a first entity environment. Further at least some other of the heterogeneous communication gateways and the second set of heterogeneous devices may be associated with a second entity environment that differs from the first entity environment.

Moreover, certain embodiments of the present disclosure relate to a heterogeneous communication gateway that comprises a plurality of communication devices including a first communication device and a second communication device. The first communication device may be of a different device type than the second communication device. Further, the heterogeneous communication gateway may include a storage device programmed to store a protocol layer. This protocol layer may comprise a plurality of communication interfaces for interacting with a plurality of heterogeneous devices. In addition, the heterogeneous communication gateway can include a hardware processor programmed to access data from a first device at one of the first communication device or the second communication device and determine a type of the first device using the protocol layer. The hardware processor may be further programmed to translate the data from a format associated with the type of the first device to a format associated with an observer system using the protocol layer. This observer system may be implemented on computer hardware. In addition, the hardware processor may transmit the translated data to the observer system.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIG. 20 illustrates an example of an actual implementation of an observation that includes data and semantic information in accordance with embodiments of the present disclosure.

DETAILED DESCRIPTION OF PARTICULAR EMBODIMENTS

Overview

Traditional computing devices, such as desktop and laptop computers, are not the only devices that can communicate over a network. A variety of computing devices can communicate over networks including, for example, including personal computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), kiosks, speaker systems, and various other electronic devices and appliances. Further, many sensors and smart appliances, or appliances that include some amount of computer hardware, can also communicate over a network.

There is often a desire to create a network of "things," which can include any type of device that can be configured to communicate information over a network. These things can include not just traditional computing devices, but other devices that may communicate information and/or be controlled over a network. For example, the things may include the aforementioned sensors or appliances, such as refrigerators or televisions. Thus, in some cases, these things may be referred to as "heterogeneous devices." It can be challenging to create a network of these heterogeneous devices for a variety of reasons. For example, many different devices will support different communication technologies, such as Bluetooth®, near field communication technologies, 4G cellular communication, global positioning system, radio frequency identification (RFID) technologies, LoRa®, and Zigbee®. Further, devices that perform the same or similar function may use different communication technologies. For example, two different sensors that are each configured to measure temperature may communicate with a network using a different communication standard.

Not only can data accessible from different heterogeneous devices be communicated using different technology, but the data may be presented differently. For instance, continuing the above example with the temperature sensors, one sensor may measure temperature in Fahrenheit and another sensor may measure temperature in Celsius. Moreover, the different sensors may identify the temperature differently or have differently levels of accuracy. Thus, a heterogeneous device that is basing a determination on temperature readings from different temperature sensors may be required to not only support different communication technologies, but also may be required to support different formats for the same or similar data.

Figure 1:
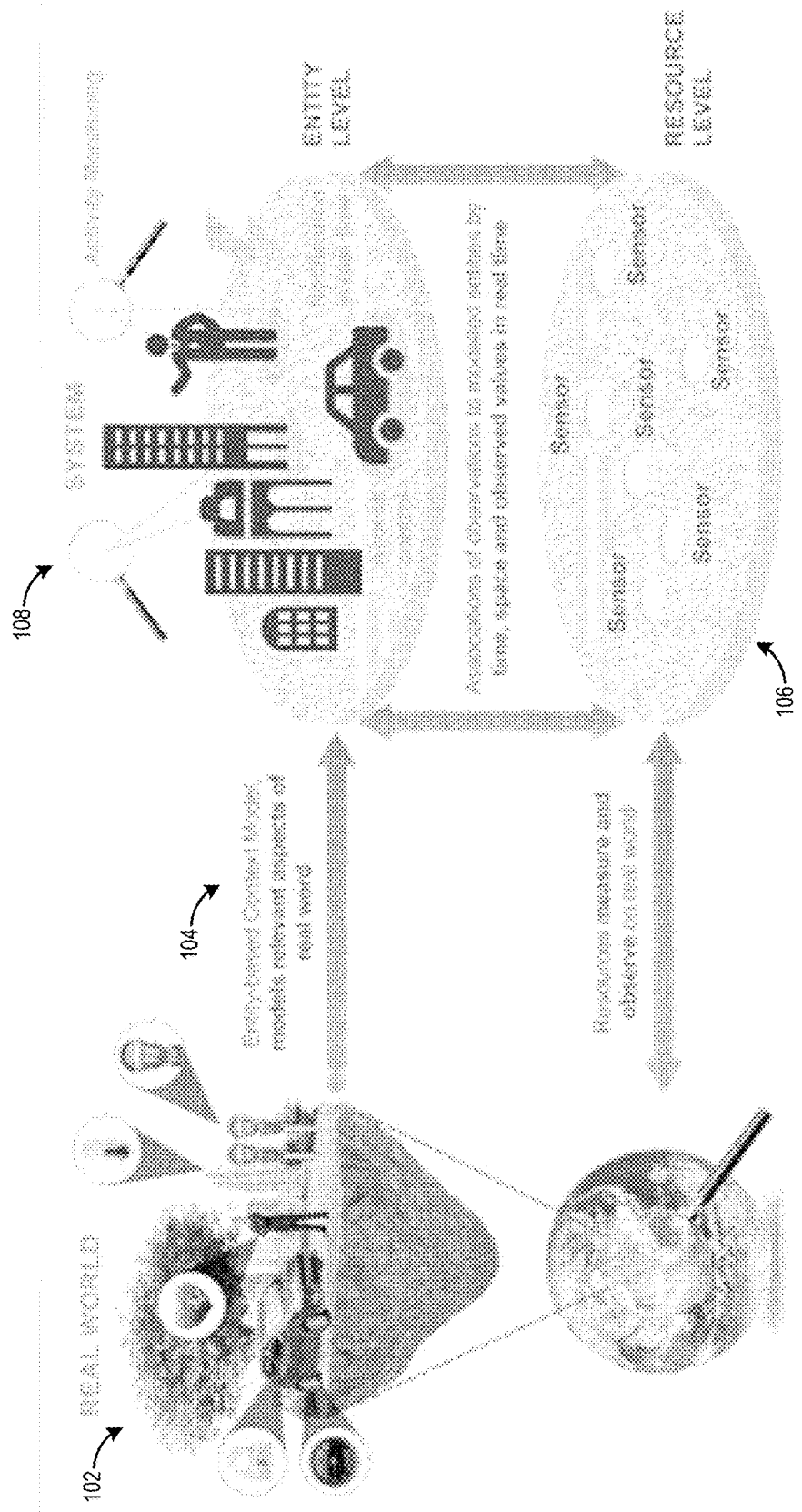
FIG. 1 illustrates a high-level overview of the Internet of Things.

One solution to the aforementioned problems is for a user or entity to develop a network of heterogeneous devices or things, which may sometimes be referred to as the Internet of Things (IoT), using devices that are developed by the same manufacturer or conform to a particular standard. FIG. 1 illustrates a high-level overview of the Internet of Things. The Internet of Things may include a network of physical objects (things) with unique identifiers and the ability to communicate and sense, as well as interact with the internal states of the things and/or the external environment, without requiring human-to-human or human-to-computer interaction, by leveraging a network, such as the Internet. These physical objects, or heterogeneous devices, may be computing devices, other devices that include at least some computational capability (e.g., a smart refrigerator, a smart washing machine, a smart thermostat, etc.), sensors that can be used to measure one or more characteristics of a thing or an environment (e.g., temperature sensors, weight sensors, air quality sensors, etc.), or any other device that communicate information and/or be controlled over a network. Generally, the IoT applications require a standard protocol to communicate the meaning of the changes in the state of the things (e.g., sensors or devices) that form the IoT. Embodiments of the present disclosure present a domain application protocol that allows communication interactions between heterogeneous things. In some implementations, the domain application protocol, or protocol, they leverage particular network standards, such as linked data, resource description framework, and representation representational state transfer (REST), and the like. However, embodiments disclosed herein are not limited as such and may be implemented using application-specific systems.

Referring to FIG. 1, the IoT can provide a digital view or context model 104 of a portion of the real world 102. This context model 104 may provide a view of and/or control over an entity level 108 of physical systems. Moreover, the context model may be generated, at least in part, by data or observations gathered from a set of sensors 106 (or other devices) that can provide a view of the world. Often, the sensors 106 may be a set of heterogeneous devices that provide differently functionalities within the network enabling the context model to present data associated with many different aspects of the portion of the physical world 102. For example, the sensors 106 may include many different types of sensors. Moreover, the sensors 106 may also be used to provide information that helps control many other devices at the resource level and/or at the entity level 108. The sensors 106 and devices at the entity level may often be combined in a network as part of the IoT.

However, with many networks of heterogeneous devices, it may not be feasible to find a manufacturer that makes all of the devices. For instance, suppose that a farmer desires to track the location of his or her cattle and control the gates to the pens that house the cattle. If the farmer cannot locate a manufacturer that develops both geolocation sensors that can be attached to the cattle and remote gate access systems, it may not be possible for the farmer to develop a system that can monitor the location of the cattle and automatically determine whether to open, close, or prevent from opening or closing the gates to the pens because, the sensors and the gate controllers may operate using different communication technologies.

Further, a user may use different devices to obtain the same or similar data or observation in different locations. The use of different devices for obtaining the same or similar data may occur because, for example, the user may expand the network over time and the availability of particular devices may change over time. One manufacturer may go out of business or another manufacturer may provide better or cheaper devices. Alternatively, or in addition, standards may change and/or device models may change over time. Thus, in many instances, creating a uniform network of devices that operate using the same communication technologies and/or provide data in the same format or manner may not be feasible. In other words, not only may a user or entity be required to develop a network using devices that serve different purposes or functions, but the user or entity may also be required to use different types of devices that are intended to serve the same function.

Moreover, it may be desirable to have different networks of devices communicate with each other. Thus, even when a user can create a uniform network of interoperable devices, the network may still be required to interoperate with other networks that are not uniform in either the communication technology used or in the way the devices present information or are controlled.

Figure 2A:
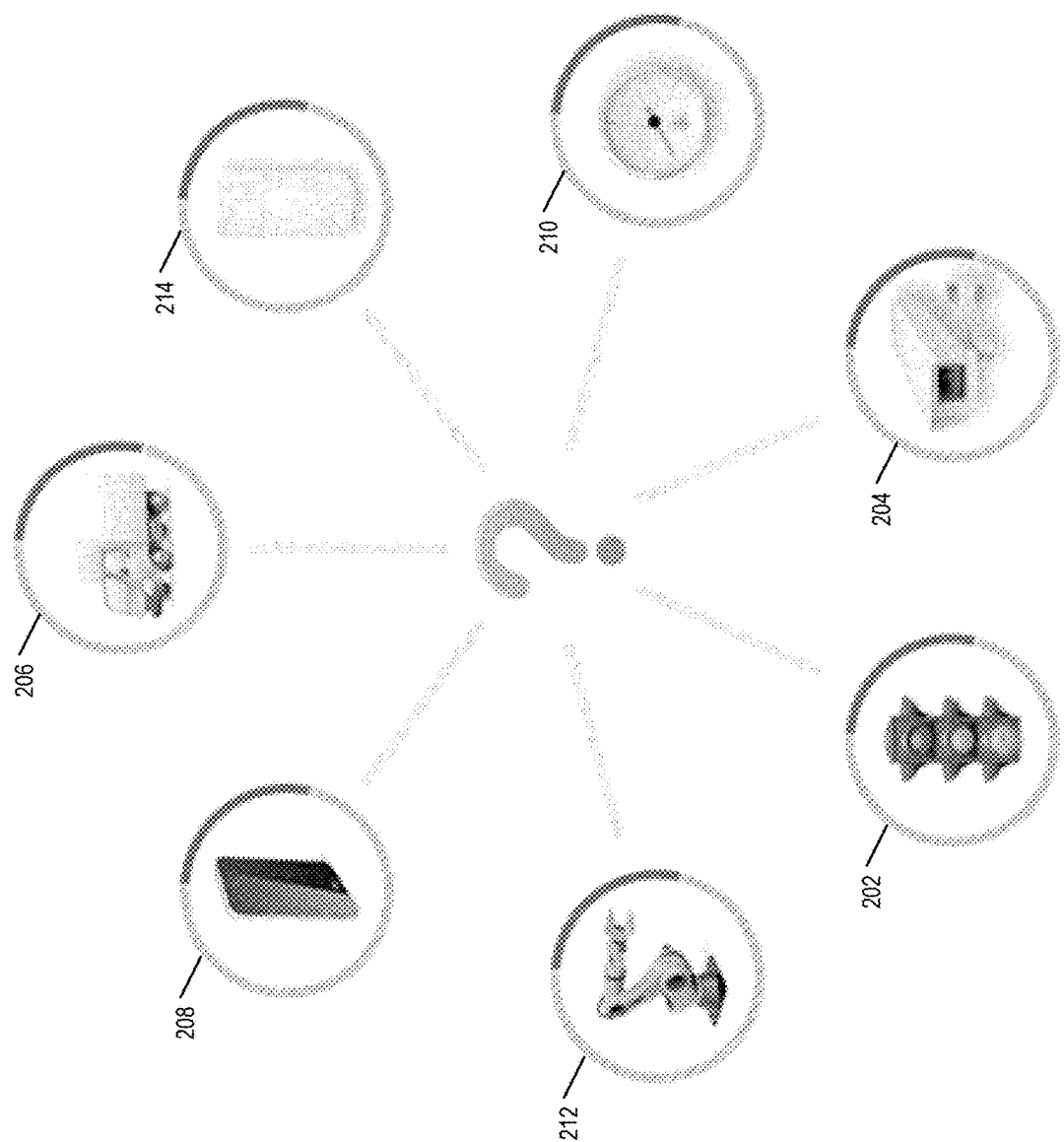
FIG. 2A illustrates one challenge with communication between a network of heterogeneous devices.

FIG. 2A provides a simplified pictorial view of some of the above-described problems of communication among heterogeneous devices. It may be desirable for the heterogeneous or disparate devices illustrated in FIG. 2A to communicate. For example, a traffic light 202 may communicate with a camera 204 to inform the camera 204 when the light turns red enabling the camera 204 to determine whether the truck 206 drove through an intersection when the light was red. This information may be provided to a computing device, such as a computing device 208 that informs a fleet manager of the status of the vehicle fleet including whether the driver of the truck 206 is following traffic laws. The truck 206 may be a refrigerated truck with a thermostat 210 for determining whether the cargo of the truck 206 is maintained at an appropriate temperature, which can be used by the loader 212 to determine whether to unload the cargo from the truck 206 or to reject the delivery. Moreover, cargo in the truck 206 may identify itself to a refrigerator 214 at the delivery location to inform the refrigerator of the optimal temperature for the cargo that is to be delivered at a particular time. However, if each of the devices 202-214 use different communication technologies and different data and command formats, it can be challenging to create the example network described above without a user manually accessing data from the heterogeneous devices and manually controlling the heterogeneous devices. This manual intervention can make creating a network of heterogeneous things cost prohibitive and, in some cases, technically infeasible.

Embodiments of the present disclosure define a protocol that enables heterogeneous devices to communicate with each other. Thus, in certain embodiments, sets or networks of heterogeneous devices can measure different environment characteristics for an operating environment, make decisions about the operating environment, and control the heterogeneous devices within the operating environment based on the decisions using machine to machine (M2M) interaction without involvement from a user. This protocol may be implemented using a domain application protocol (DAP), which may be implemented using a representational state transfer (REST) architecture.

Figure 2B:
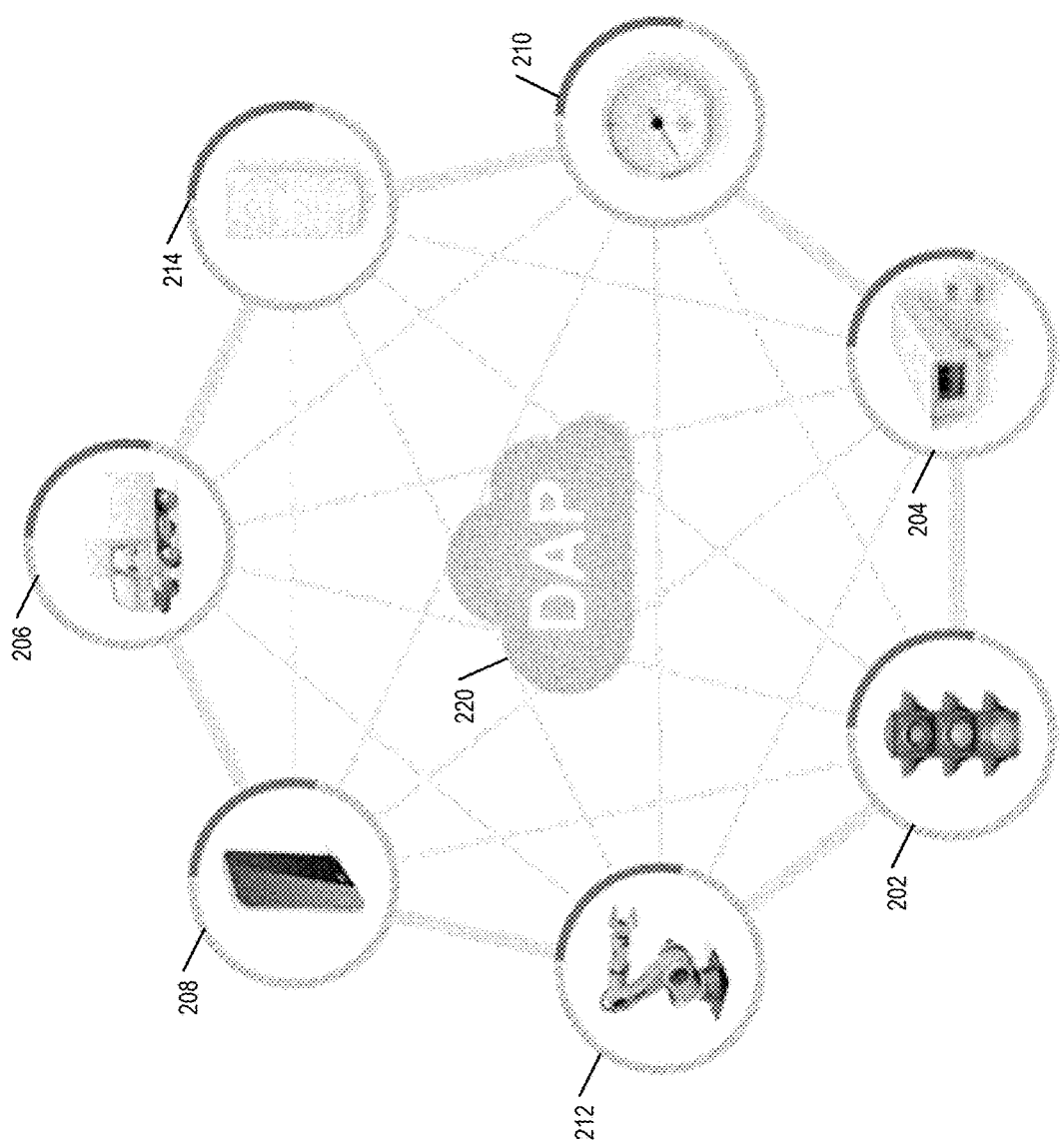
FIG. 2B illustrates a high-level overview of addressing the problem illustrated in FIG. 2A.

FIG. 2B illustrates the application of the protocol 220 enabling the communication of the heterogeneous devices 202-214 described with respect to FIG. 2A. As illustrated, the protocol 220 may enable the heterogeneous devices to communicate with each other enabling automated processing of devices that may be produced by different manufacturers, implement different communication protocols, provide different data, and/or present data using different formats. Thus, the use of the protocol 220 can reduce user interaction with respect to a network of things or devices, which can save user time and money. Moreover, the use of a common protocol that can translate communications between heterogeneous devices can reduce the use of computational resources reserved for communication between the devices. For example, memory and processing resources for communication between devices can be reduced as each device can communicate as originally manufactured while a gateway device (not illustrated) implementing the common protocol 220 can facilitate the translation of communications between the devices 202-214.

Figure 3:
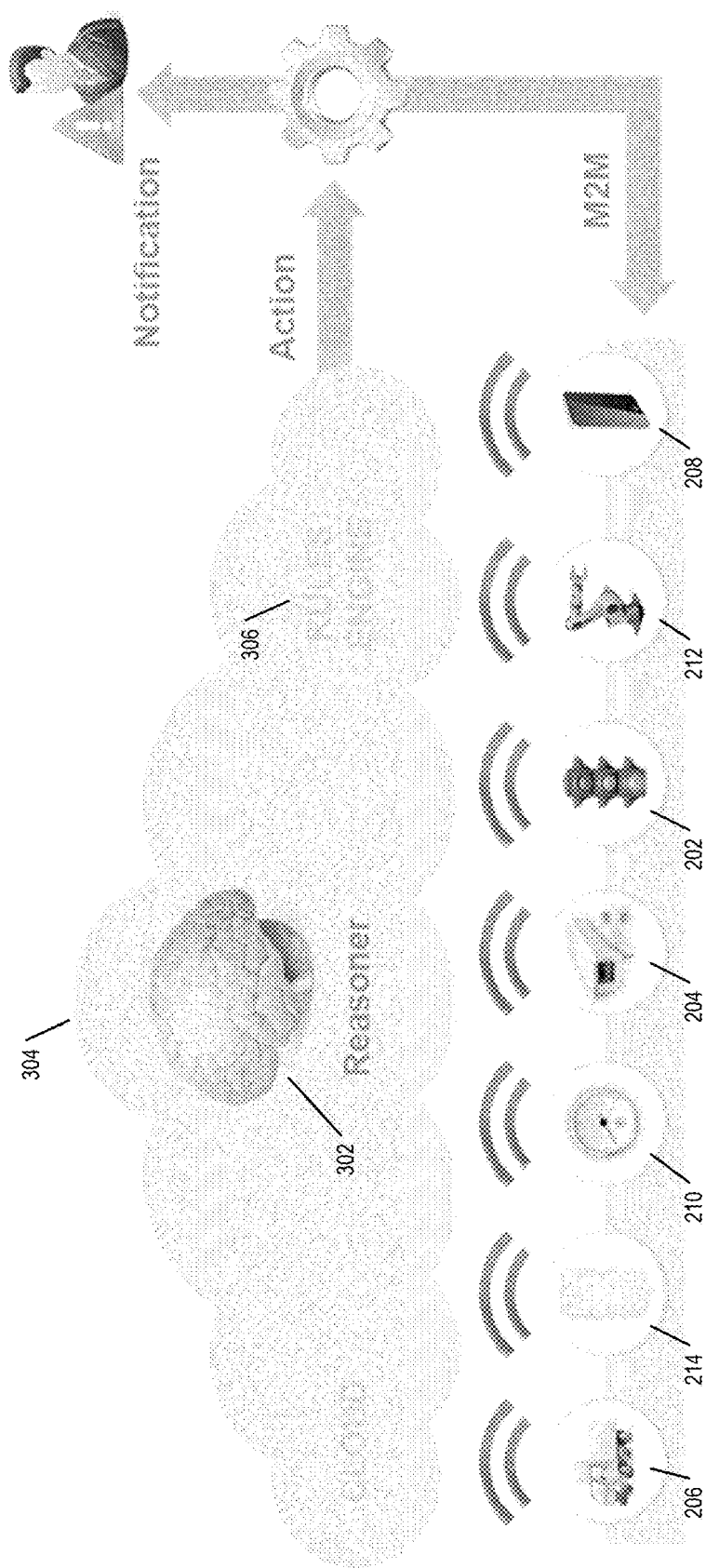
FIG. 3 illustrates an overview of event processing for a system using heterogeneous devices.

In certain embodiments presented herein, the implementation of the protocol can be used as part of a complex event processing system. FIG. 3 illustrates an overview of event processing for a system using heterogeneous devices based on the non-limiting example illustrated in FIG. 2B. As illustrated, each of the devices 202-214 may communicate with an event processing system 302, which may be referred to as a reasoner. In some embodiments, the event processing system 302 may implement the protocol 220 described with respect to FIG. 2B. In other embodiments, a communication gateway that implements the protocol 220 may process communications between the heterogeneous devices 202-214 and the event processing system 302.

As illustrated by the cloud 304, the event processing system 302 may be implemented in a separate environment from one or more of the heterogeneous devices 202-214 and may be accessible over a network, such as the Internet. Further, the event processing system 302 implement a rules engine 306 that can determine one or more actions to be performed in response to the data or observations received from one or more of the devices 202-214. These actions may include obtaining additional observations and/or modifying the configuration of one of the devices 202-214. Thus, the event processing system 302 may facilitate machine to machine communications. Further, in certain embodiments, an observation from one of the devices 202-214 may cause the event processing system 302 to notify one or more authorized users of the occurrence of an event or the satisfaction of a particular threshold.

Example Use Case

Figure 4A:
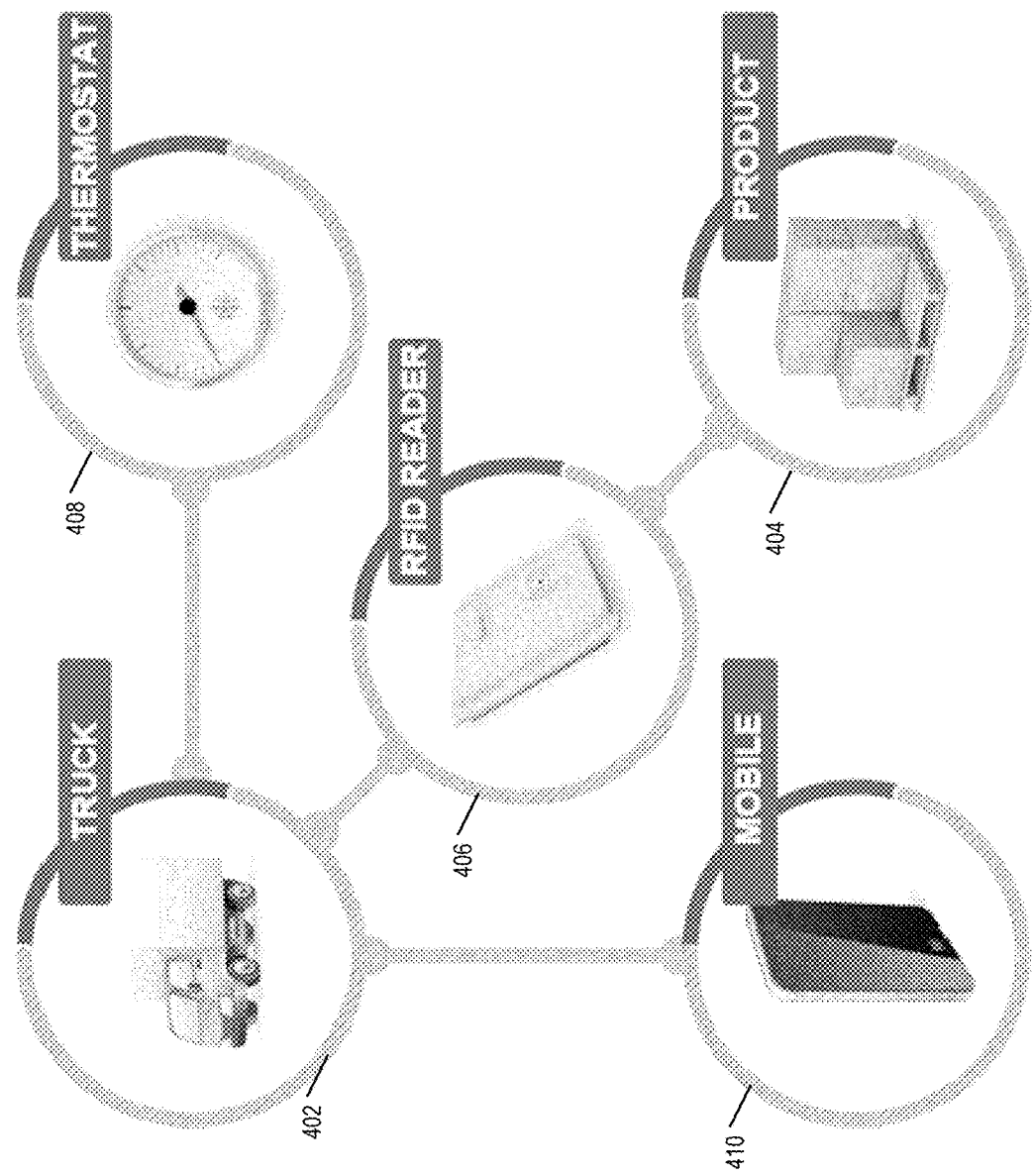
FIG. 4A illustrates an example use case of certain embodiments of the present disclosure.

FIG. 4A illustrates an example use case of certain embodiments of the present disclosure. In the example use case, a truck 402 may be transporting cargo 404 that includes machine-readable codes that may identify a required or preferred temperature for the cargo 404. An RFID reader 406 may be installed in the truck 402 that can automatically scan the machine readable code of the cargo 404 as it is loaded into the truck 402. Further, the RFID reader 406 may determine the required temperature for the cargo 404 on scanning the machine-readable code of the cargo 404. The RFID reader 406 may then provide the required temperature to the thermostat 408, which can automatically adjust the temperature or the truck 402 to satisfy the required temperature of the cargo 404. The thermostat 408 may provide the temperature setting to a computing device 410, thereby enabling a user to confirm that the cargo 404 is maintained at the appropriate temperature before accepting delivery of the cargo 404.

If each of the things 402 through 410 use different communication technologies and/or data formats, the above use case may not be possible using traditional IoT networks. However, by using the protocol of the present disclosure, an intermediary device, such as a communication gateway, can be used to enable the heterogeneous things 402 through 410 to communicate with each other and implement the aforementioned use case of FIG. 4A.

Figure 4B:
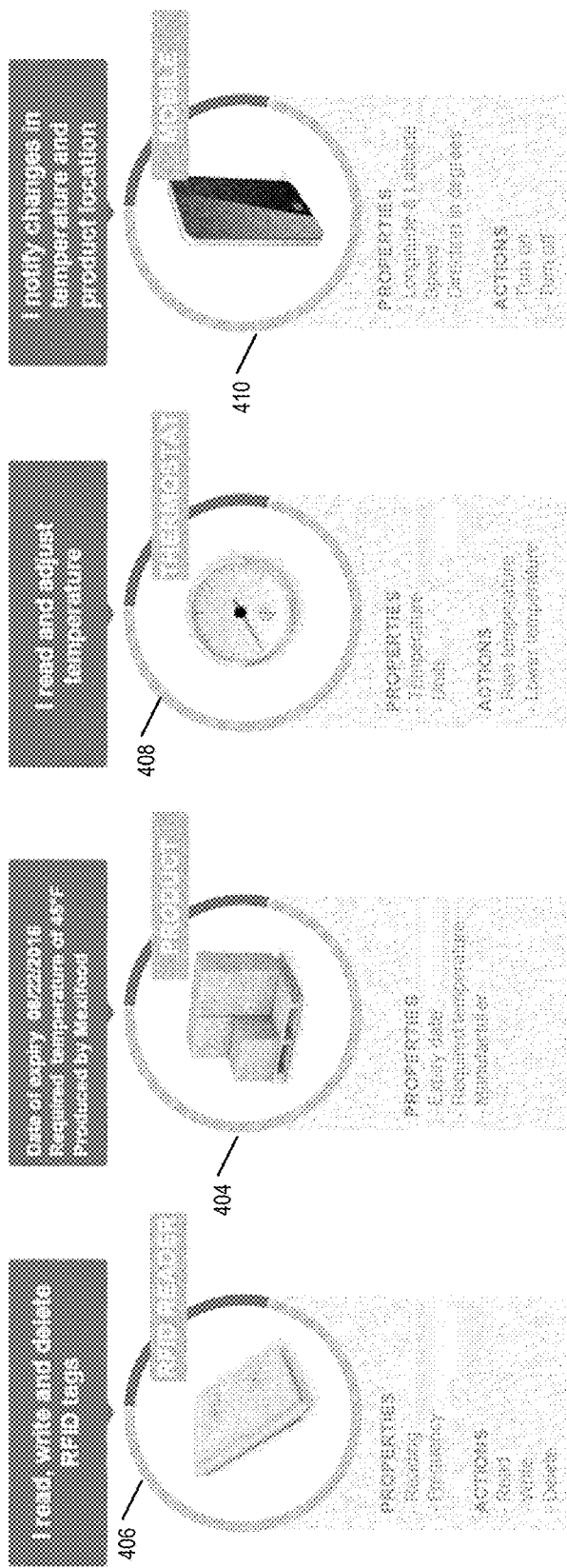
FIG. 4B illustrates additional details of the example illustrated in FIG. 4A.

As stated above, this protocol or protocol layer may be implemented on devices that serve as communication intermediaries. Further, the protocol layer can observe characteristics are properties of different heterogeneous devices and facilitate control of these heterogeneous devices. FIG. 4B illustrates additional details of the example illustrated in FIG. 4A along with example characteristics and actions that can be translated by the protocol layer to enable interoperability or communication between heterogeneous devices.

For example, the thermostat 408 may include a temperature property and a units property. An observer system can obtain an observation of the properties that includes data provided by the thermostat and a semantic that enables the data to be understood by another device. For example, the temperature value can be read from the thermostat 408 and associated with a semantic that identifies the data as a temperature, a semantic that identifies the number of place values for the temperature, and a semantic that identifies the units of the temperature. A second device that provides a temperature reading or that takes an action based on the temperature reading may use different units for the temperature or a different number of place values. Thus, an intermediary device that facilitates communication between the thermostat and the second device may use the protocol layer to determine the appropriate format for the temperature and translate the temperature to satisfy the format of the second device, thereby enabling the two heterogeneous devices to communicate and/or for data from the two devices to be aggregated.

Example Interactive Computing Environment

Figure 5:
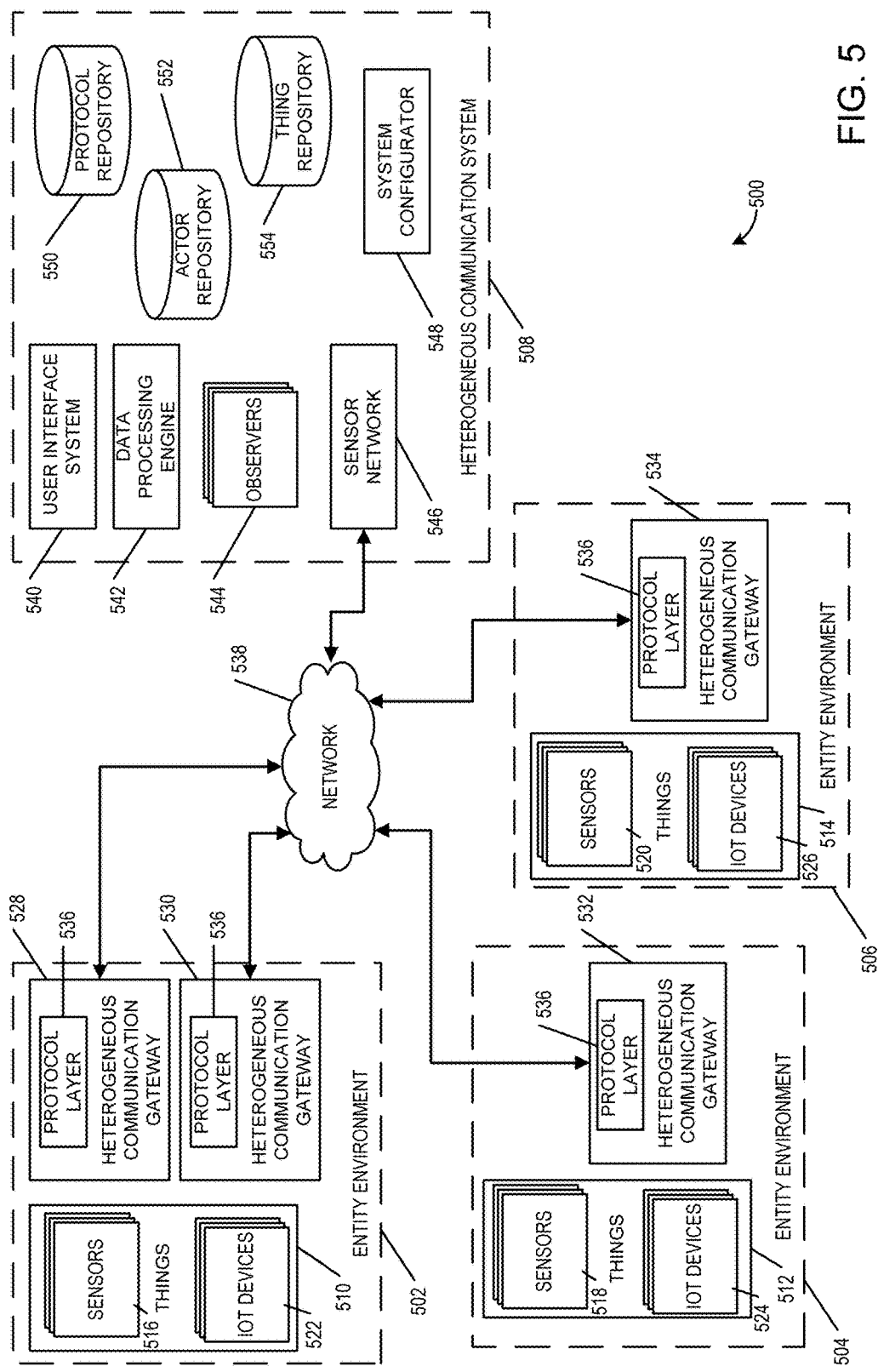
FIG. 5 illustrates a block diagram of an overview of an interactive computing environment in accordance with certain embodiments of the present disclosure.

FIG. 5 illustrates a block diagram of an overview of an interactive computing environment 500 in accordance with certain embodiments of the present disclosure. The interactive computing environment 500 may include a number of entity environments. Although three entity environments 502, 504, and 506 are depicted, the present disclosure is not limited as such and any other number of entity environments may be included as part of the interactive computing environment 500. In addition, the interactive computing environment 500 can include a heterogeneous communication system 508. Although a single heterogeneous communication system 508 is illustrated, multiple heterogeneous communication systems may exist and may operate independently of each other or in combination.

Each of the entity environments 502, 504, and 506 may be associated with the same entity or a different entity. For example, the entity environment 502 and 504 may represent different geographic locations for a particular entity. For instance, the entity environment 502 may be associated with a warehouse of an entity and the entity environment 504 may be associated with a manufacturing facility of an entity, which may be located together with the warehouse or in a separate geographic location. In contrast, the entity environment 506 may be associated with a different entity, such as a customer or an independent distributor of products produced by the entity associated with the entity environments 502 and 504.

In some cases, an entity environment may be associated with or may be a mobile environment. For instance, the entity environment 504 may represent a delivery vehicle for delivering items manufactured at the entity environment 502. In some embodiments, an entity environment may be defined based at least in part on a location of things within the environment. For example, the entity environment 506 may be defined based on the location of grazing cattle that are external to a fenced environment in that are each equipped with a tag, such as an RFID tag. Thus, in this example, as the cows move from one geographic area to another geographic area, the entity environment 506 may change with the movement of the cows.

Each of the entity environments may include a set of one or more things 510, 512, and 514. The things 510, 512, and 514 may include any type of animate or inanimate object that can be included in a networked environment (e.g. an implementation of an Internet of Things). Further, the things 510, 512, and 514 may include any type of object that may communicate data for may enable another device to obtain data over a network from the object. Moreover, the things 510, 512, 514 may include any type of object that may be controlled and/or configured by another device via a network. In some embodiments, the things 510, 512, and 514 may include objects that may not be able to communicate via networked environment, but that can be transformed into objects that can communicate via the network environment by, for example, attaching a sensor or other device to the object. For example, in some cases, the things 510, 512, and 514 may include animals that can be tagged with a sensor to determine the animals' location, health, or other characteristic of the animals.

As illustrated, the things 510, 512, 514 may include sensors 516, 518, 520, respectively. These sensors 516, 518, 520 can include any type of sensor that can measure one or more characteristics of the entity environment. For example, the sensors 516, 518, 520 may include location sensors, temperature sensors, weight sensors, signal strength sensors, light sensors, sound sensors, motion sensors, and the like. Moreover, these sensors 516, 518, 520 may be located anywhere or on anything within the entity environment. For example, the sensors may be located on any portion of the inside or outside of a building or vehicle, on or in an animal, or on cargo, and the like.

In addition to, or instead of, the sensors 516, 518, 520, the things 510, 512, 514 may include one or more devices 522, 524, 526, respectively. These devices 522, 524, 526 may include any type of devices that can present data and/or be controlled or configured remotely via a network. Further, the devices 522, 524, 526 may include both computer systems and non-computer systems that may include some computational functionality and/or one or more components that can be accessed remotely via a network. For example, the devices 522, 524, 526 may include laptops, application-specific hardware, televisions, smart appliances (e.g., refrigerators, washing machines, microwaves, and the like), thermostats, smart doorbells, door openers, gates with electronic opening or closing mechanisms, factory or manufacturing systems, warehouse robots, and any other type of device that can interact with another device over a network. In other words, between the sensors and the devices, the things 510, 512, and 514 can include any type of object that can be networked in an IoT implementation.

Each of the entity environments 502, 504, 506 may include one or more heterogeneous communication gateways. As illustrated, some of the entity environments can include multiple heterogeneous communication gateways, such as the entity environment 502 which includes to heterogeneous communication gateways 528 and 530. Other entity environments may include more or less heterogeneous communication gateways. For example, the entity environment 504 includes a single heterogeneous communication gateway 532 and entity environment 506 similarly includes a single heterogeneous communication gateway 534. The heterogeneous communication gateways can include any type of communication system that can facilitate communication between things of an entity environment and things of different entity environments. Example embodiments of the heterogeneous communication gateways are described in more detail below with respect to FIG. 7.

Each of the heterogeneous communication gateways can implement a protocol layer 536 to facilitate communication between heterogeneous devices and/or sensors. This protocol layer 536 can be implemented as, or may serve as an interface layer between a set of homogeneous or heterogeneous devices and/or sensors. Further, the protocol layer 536 may serve as an interface layer between the devices or sensors and the heterogeneous communication system 508, or systems thereof. This protocol layer 536 may be implemented using any type of software that can be used to define access protocols for accessing data from different types of devices or sensors. For example, the protocol layer 536 may be generated using linked data, an extensible markup language (e.g., XML), JavaScript Object Notation (JSON), a resource description framework, application-specific APIs, or any particular programming language that can be used to access data or APIs from other systems (e.g., the devices 522 or sensors 516).

In certain implementations, the protocol layer 536 is an extensible protocol that enables definitions or semantics associated with particular things 510 to be modified or updated. Further, the definition of or the semantics for new types of things 510 may be added to the protocol layer 536. Thus, advantageously, an end user can create a network of things using any type of devices or sensors without the problem of adding a device that is unable to interface with other devices of the network of things. The protocol layer 536 can be extended by the end user or by an administrator who may be associated with the same entity as the end user, or who may be associated with a separate entity. For example, upon the identification of a new thing type, an administrator can extend the protocol layer at the heterogeneous communication system. This extended protocol layer may then be transmitted to any number of heterogeneous communication gateways that may be associated with any number of entities. Thus, a non-technical user can create a network of things without concern for whether the selected things will be able to interoperate. However, a technical user or administrator can define a new semantic for a thing that the user desires to add to the network of things. Further, because the protocol layer can be distributed from the heterogeneous communication system 508 to one or more heterogeneous communication gateways, once one user or entity has defined the semantics for a device type, other users or entities can use the device type without defining the semantic. Thus, in certain cases, a manufacturer may provide a semantic for a new device to the heterogeneous communication system 508 enabling customers or end users to add the new device type to their network of things without modifying the protocol layer 536, generating entity-specific communication software, or limiting the selection of device types for the network.

It should be understood that, in some cases, communication with certain devices may be limited to accessing data from the devices. For example, certain sensors may make data available without providing any other communication functionality or control functionality of the devices. However, other devices may be more complex and may enable configuration changes and/or the initiation of the execution of particular commands or actions. The protocol layer 536 enables the heterogeneous communication gateway to modify and/or format data or commands received from a thing and/or to be provided to a thing. Although each protocol layer 536 illustrated in FIG. 5 shares the same reference number indicating that each of the protocol layers are the same, in some embodiments at least some of the protocol layers may differ at least in part. For example, in some cases, some heterogeneous communication gateways may be provided a portion of the protocol layer which may differ from portions of the protocol layer provided to other heterogeneous communication gateways. Further, in some cases, some heterogeneous communication gateways may only receive a portion of the protocol layer corresponding to particular things that are in communication with the heterogeneous communication gateway. Further, in some cases, a heterogeneous communication gateway may access additional portions of the protocol layer 536 or may receive updates to the protocol layer 536 from the heterogeneous communication system 508.

The heterogeneous communication gateways 528, 530, 532, 534 may communicate with each other and/or the heterogeneous communication system 508 via the network 538. The network 538 may include any type of network. The network 538 may be a publicly accessible network of linked networks, possibly operated by various distinct parties. Further, in some cases, the network 538 may include the Internet. In other embodiments, the network 538 may include a private network, personal area network, local area network, wide area network, cable network, satellite network, cellular telephone network, etc., or combination thereof, each with access to and/or from an external network, such as the Internet.

The heterogeneous communication system 508 may serve a number of roles within the interactive computing environment 500. For example, the heterogeneous communication system 508 may enable the modification and distribution of the protocol layer 536 to one or more heterogeneous communication gateways enabling the communication between heterogeneous devices, such as those included in the things 510, 512, 514. Further, the heterogeneous communication system 508 can gather and/or aggregate data or observations from the various things 510, 512, 514. These observations may be data associated with particular semantics. For example, data may include a numeric value on observation may include the numeric value and metadata identifying the numeric value as a temperature reading, identifying the temperature reading as being measured in Celsius, and identifying the maximum error associated with the temperature reading.

In some embodiments, the heterogeneous communication system 508 may present the individual data or observations and/or the aggregated data or observations to other systems and/or users. Further, the heterogeneous communication system 508 may automatically perform or initiate the performance of one or more actions in response to the accessed data or observations.

The heterogeneous communication system 508 can include a number of systems implemented in hardware, software, or combination of hardware and software that enable the previously described features of the heterogeneous communication system 508 as well as other features described herein and/or understood by those of skill in the art. These systems can include user interface system 540, data processing engine 542, one or more observers 544, sensor network 546, system configurator 548, protocol repository 550, actor repository 552, and thing repository 554.

The user interface system 540 enables a user, such as an employee of an entity or an administrator, to view data or observations obtained from one or more of the things 510, 512, 514. Further, the user interface system 540 enables a user to modify or generate the protocol layer 536, which may be stored at the protocol repository 550 and distributed to one or more heterogeneous communication gateways by the heterogeneous communication system 508. By modifying the protocol layer 536, new types of devices or things may be added to a network of things without individually modifying systems at one or more entity environments. Further, by modifying the protocol layer at the heterogeneous communication system 508, existing devices within the network of devices may be updated or modified without modifying individual systems are heterogeneous communication gateways.

In some embodiments, the user interface system 540 can determine whether a user is authorized to view observations, modify the protocol layer, or otherwise interact with things within the network of things accessing authorization information for the user from the actor repository 552. By regulating a user's access to the heterogeneous communication system 508, things 510, 512, 514, or the heterogeneous communication gateways 528-536, system security may be maintained.

The data processing engine 542 can analyze observations provided by the observers 544 to determine whether or not to take an action with respect to one or more things 510, 512, 514. Further, the data processing engine 542 can generate a command to be provided to one or more things 510, 512, 514 in response to determining that observation satisfies or fails to satisfy a particular threshold. In some embodiments, the data processing engine 542 may generate the command in response to an observer 544 determining that an observation satisfies or fails to satisfy the particular threshold. Although illustrated as a single data processing engine 542, in some embodiments the heterogeneous communication system 508 may include multiple data processing engines 542. In some cases, each data processing engine 542 may be associated with different entity environments, different things, different observers 544, and/or different observations.

The one or more observers 544 can include any system that monitors observations from one or more things 510, 512, 514. In some cases, the one or more observers 544 may trigger the data processing engine to take one or more actions in response to determining that an observation satisfies or fails to satisfy a particular threshold.

In certain embodiments each of the observers 544 may be configured to monitor different types of observations. For example, one observer 544 may monitor temperature while another observer 544 may monitor weight values that an entity environment. Further, some observers may be configured to monitor observations in one entity environment while other observers may be configured to monitor observations at another entity environment.

The sensor network 546 may aggregate different observations from a particular entity environment or from a plurality of entity environments. These observations may be made accessible to the observers 544 for determining whether or not to trigger an action by the data processing engine 542.

The system configurator 548 may be used to configure the network of things. In some embodiments, a user may interact with the system configurator 548 via the user interface system 540. The system configurator 548 can be used to configure the observers 544, the sensor network 546, and/or the data processing engine 542. Moreover the system configurator 548 can be used to configure one or more thresholds used by the observers 544 to trigger action by the data processing engine 542. Further, the system configurator 548 can be used to configure the types of actions to be performed or initiated by the data processing engine 542 in response to one or more triggers generated by the observers 544.

The protocol repository 552 may store one or more embodiments of the protocol layer 536. This protocol layer 536 may be generated at the heterogeneous communication system 508 stored at the protocol repository 550. Portions of the protocol layer may be provided to the heterogeneous communication gateways to enable the heterogeneous communication gateways to facilitate communication between heterogeneous things or devices.

The actor repository 552 may include the identity and permissions for various actors that may interact with the different systems included in the network of things. The actors may include both users and other devices.

The thing repository 554 may include the identity of the various things 510, 512, 514 included in the network of things. Further, the thing repository 554 may store metadata associated with the things 510, 12, 514, such as location, functionality, operational status, and the like.

Complex Event Processing Engine

In certain embodiments, portions of the interactive computing environment 504 may form a complex event processing engine that is capable of automatically controlling one or more things in response to one or more observations among a heterogeneous network of devices or things. This complex event processing engine may be a conceptual system formed from various systems included in the interactive computing environment 500 of FIG. 5.

Figure 6:
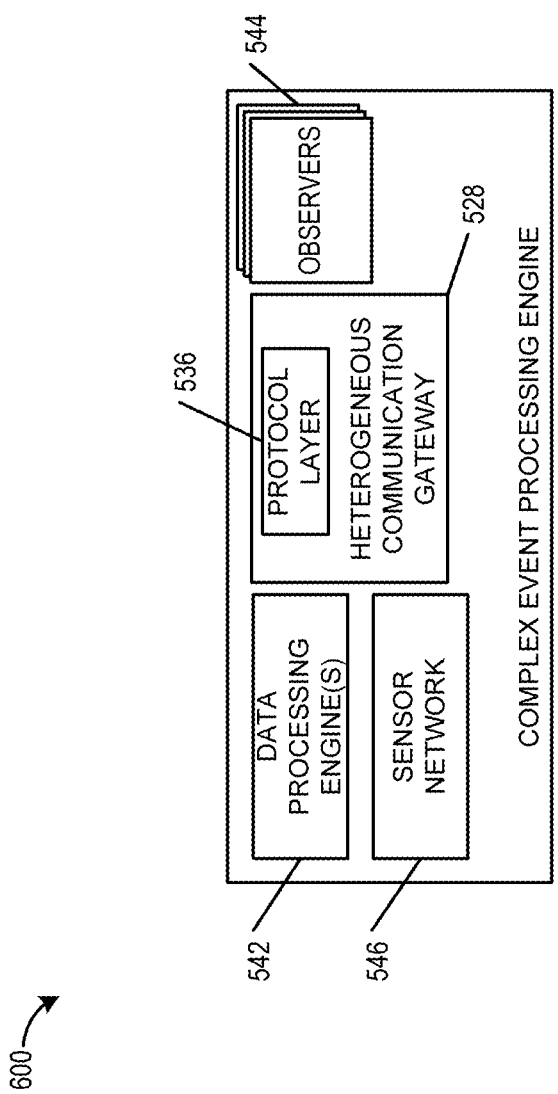
FIG. 6 illustrates a block diagram of an embodiment of a complex event processing engine.

FIG. 6 illustrates a block diagram of an embodiment of the conceptual complex event processing engine 600. The conceptual complex event processing engine 600 may include the one or more data processing engines 542; the sensor network 546; one or more heterogeneous communication gateways implementing the protocol layer 536, such as the heterogeneous communication gateway 528; and one or more observers 544. The complex event processing engine 600 can be used to monitor data or observations from a plurality of networked things. Further, the complex event processing engine 600 may initiate the execution of one or more actions with respect to the plurality of networked things in response to be monitored data or observations. In some cases, these actions may include notifying one or more users or other devices within the networked things of the occurrence of an event, such as an observation satisfying or failing to satisfy particular threshold.

Example Heterogeneous Communication Gateway

Figure 7:
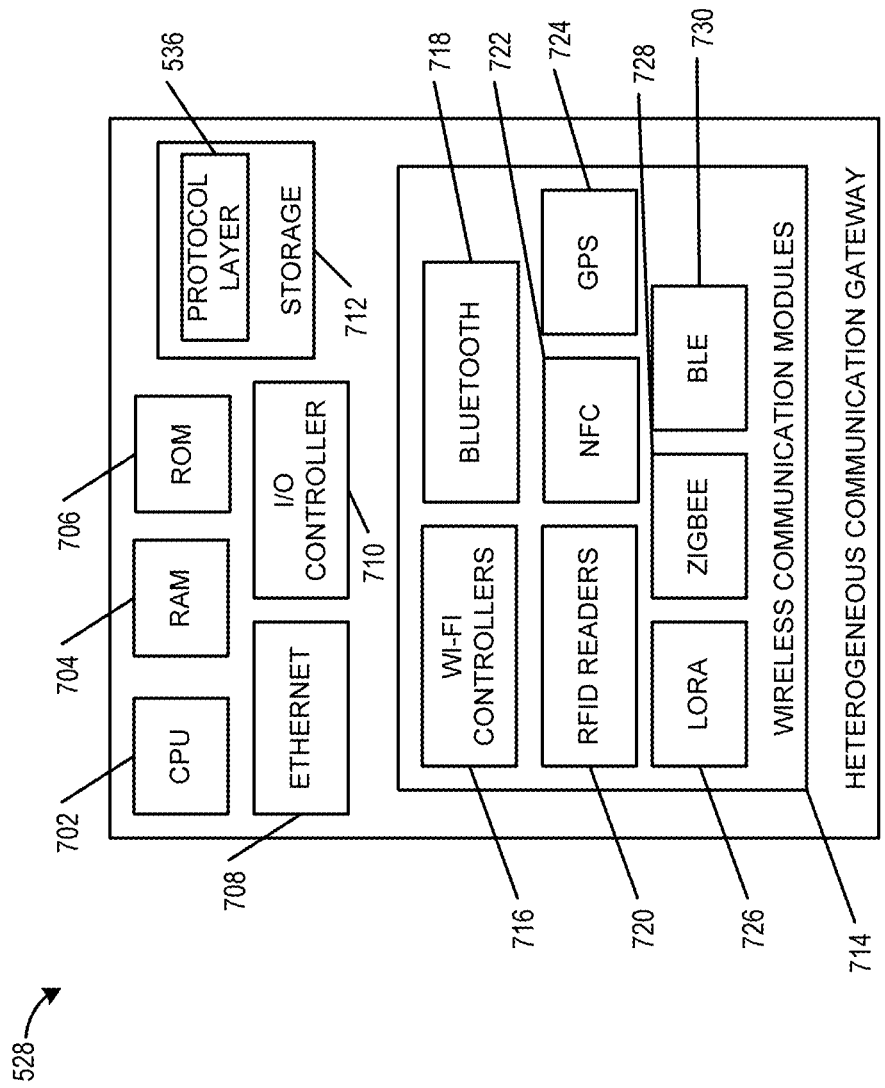
FIG. 7 illustrates a block diagram of an embodiment of a heterogeneous communication gateway.

FIG. 7 illustrates a block diagram of an embodiment of a heterogeneous communication gateway 528. In certain embodiments, each of the heterogeneous communication gateways 528, 530, 532, 534 may be configured similarly are the same as the heterogeneous communication gateway 528 illustrated in FIG. 7. In other embodiments, some of the heterogeneous communication gateways may be configured differently than some other heterogeneous communication gateways. For example, some of the heterogeneous communication gateways may include her support different wireless communication modules then some other heterogeneous communication gateways.

The heterogeneous communication gateway 528 can include a hardware processor, such as a central processing unit (CPU) 702. The CPU 702 may implement one or more instructions for accessing observations from one or more sensors or devices (e.g., one or more things 510). Further, the instructions implemented by the CPU 702 may include using the protocol layer 536 to convert observations received from one device or sensor into a format that can be understood by another device or sensor. In addition, instructions and permitted by the CPU 702 may include formatting a command into a format understood by a particular target device.

The heterogeneous communication gateway 528 may also include a number of additional elements for facilitating the utilization of the protocol layer 536 to convert observations and/or commands received from one device for transmission to another device. For example, the heterogeneous communication gateway 528 may include random access memory (RAM) 704, read-only memory (ROM) 706, and input/output (I/O) controller 710. The I/O controller 710 may include a general purpose input output (GPIO) interface. In some embodiments, the I/O controller 710 may be used to read data or access observations from one or more sensors.

In addition, the heterogeneous communication gateway 528 may include storage 712 configured to store a copy of the protocol layer 536, or a portion thereof. The storage 712 may be a non-volatile storage, such as a hard drive or solid state drive. In other embodiments, the storage 712 may be a volatile memory, such as RAM, which loads the protocol layer 536 into the memory upon activation of the heterogeneous communication gateway 526 and/or upon receipt of an observation or command.

In addition, the heterogeneous communication gateway 528 includes a number of different communication systems for communicating with a variety of heterogeneous devices and sensors. Advantageously, by including a plurality of communication systems, the heterogeneous communication gateway 528 can be used to communicate with a variety of devices and sensors, thereby enabling the creation of the heterogeneous network of things, or Internet of Things. This plurality of communication systems can include an Ethernet controller 708 as well as a variety of different wireless communication module 714. Each of the wireless communication modules 714 may be implemented as separate communication chips or dies designed to implement one or more communication protocols or standards. For example, the wireless communication modules 714 of the heterogeneous communication gateway 528 can include one or more Wi-Fi controllers 716 that can implement one or more Wi-Fi can indication standards (e.g., IEEE 802.011 standards), Bluetooth® 718, one or more RFID readers 720, one or more near field communication (NFC) technologies, a geographic positioning device (e.g., a global positioning system (GPS) device), a LoRa® device, a Zigbee® device, and a Bluetooth® low-energy device (e.g., IBeacon® or Eddystone™). It should be understood that the wireless communication modules 714 may support additional (or fewer) communication systems and/or include additional (or fewer) communication chips or dies. In some embodiments, to reduce the size and cost of the wireless communication modules 714, at least some of the wireless communication modules may share hardware, such as power amplifiers and/or antennas.

In some embodiments, the heterogeneous communication gateway 528 may be implemented as a system on chip (SOC) device. This SOC device may be configurable by the heterogeneous communication system 508. Advantageously, in certain embodiments, by using a configurable SOC device to maintain communication between a network of heterogeneous devices, costs may be reduced. Further, using the protocol layer 536 and a plurality of heterogeneous communication gateways, a network of things can be constructed without requiring specialized knowledge, thereby enabling users without technical knowledge to create and maintain the network of things. For example, a farmer can create a network of things that tracks the location and health of his or her cattle.

Example System Flow

Figure 8:
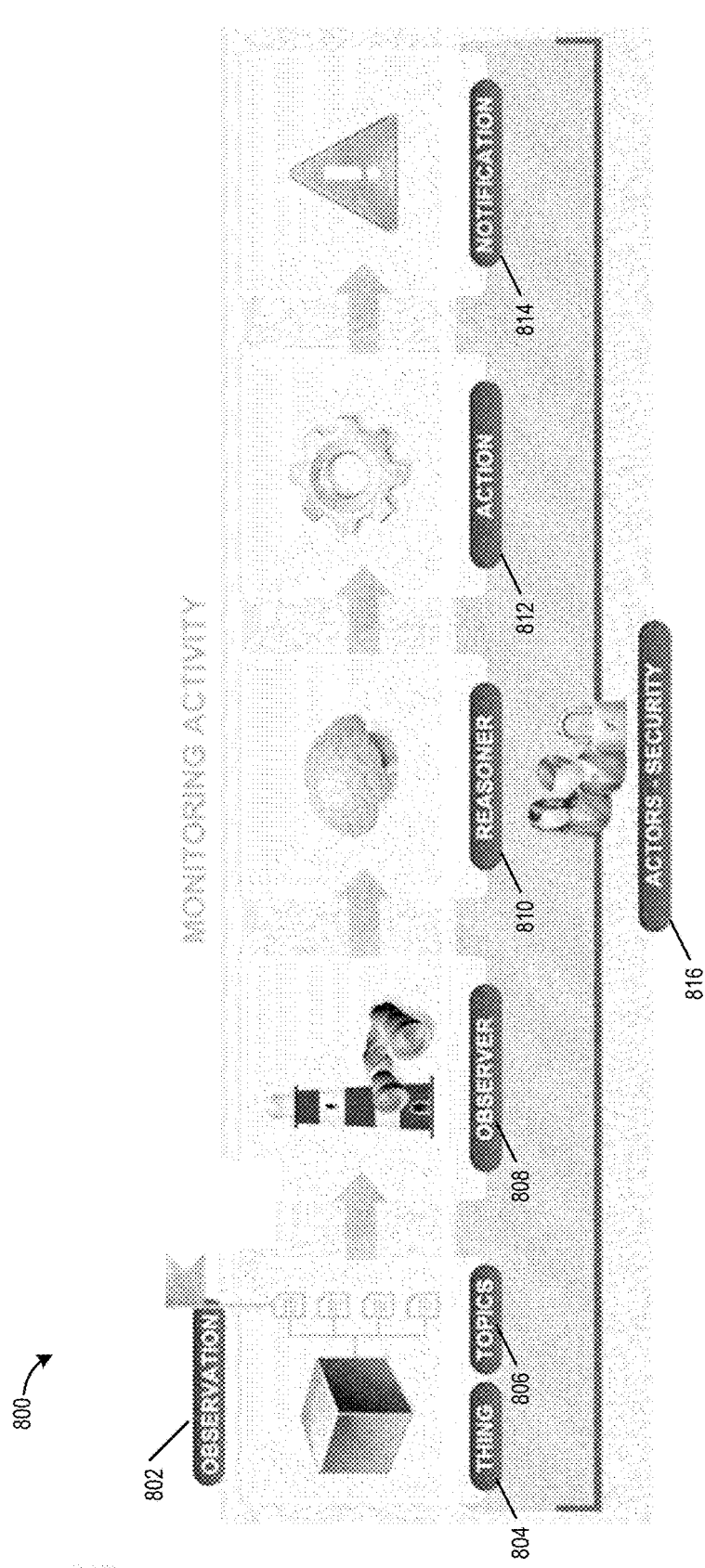
FIG. 8 illustrates an example flow of activity by the interactive computing environment.

FIG. 8 illustrates an example flow 800 of activity by the interactive computing environment 500. It should be understood that the example flow 800 is a non-limiting example of the flow of activity that may occur during operation of the interactive computing environment 500. Other activity flows are possible in accordance with the present disclosure. For example, in some implementations, observations accessed from a thing may be provided by a heterogeneous communication gateway to another thing instead of or in addition to being provided to the data processing engine 542 represented by the reasoner resource in FIG. 8.

Example flow 800 may begin with the communication or accessing of an observation 802. The observation 802 may be a resource that includes observed metrics gathered by a sensor, device, or data feed. As previously described, the observation 802 may include data and one or more semantics that characterize the data. The semantics may describe, for example, the type of data, the format of the data, the accuracy of the data, the location of the data, and the like.

The observation 802 is obtained or accessed from a thing 804. As previously described, the thing 804 may be a resource that represents an IoT thing, such as a sensor, device, or other object that may include or provide a set of observed properties to another object without human intervention. These objects may include electronic or computational objects, such as smart appliances and computing devices. Further these objects may include non-electronic or computational objects that have been modified or tagged with a device that makes data about the object accessible.

For example, these objects may include animals that are tagged with a tracking device that can communicate to location of the animals.

The observation 802 obtained from the thing 804 may be organized into one or more topics 806. The topic 806 they represent a physical organization of obtain data or observations that facilitates the publishing or communication of the observations. For example, in some implementations, the topics 806 may be implemented using a lightweight messaging protocol, such as the ISO standard MQTT.

The observation 802 may be communicated to an observer 808. Alternatively, or in addition, the observer 808 may access the thing 804 to obtain the observation 802. The observer 808 may include a resource that allows the configuration of the observation 802 upon receipt of the observation 802 to enable the observation 802 to be processed by other systems, such as the reasoner 810. In some embodiments, instead of or in addition to the observer 808 configuring an observation 802, the observation 802 may be configured or formatted by the previously described heterogeneous communication gateway, which may facilitate communication with the observer 808.

The flow 800 continues with the observation 802 being provided to a reasoner 810 (e.g., the data processing engine 542). Upon receipt of the observation 802, the reasoner 810 may determine an action 812 to execute or initiate to be executed at the thing 804 or at another thing based at least in part on the observation 802. Alternatively, or in addition, the observer 808 may trigger the reasoner 810 to take one or more actions 812 based at least in part on the observation 802. The determination of the action 812 may be based at least in part on one or more rules or thresholds associated with one or more of the observation 802 and the thing 804.

The action 812 may include any type of action that may be performed by the thing 804 or another thing in response to the observation 802 triggering an action. For example, the action 812 may include changing a configuration of the thing 804, activating our deactivating the thing 804, obtaining additional observations from the thing 804 or another thing, providing data or observations to the thing 804 or another thing, or any other action that may be performed with respect to the thing 804 one or more other things. Further, in some cases, reaction 812 may include performing or in initiating a notification 814 to one or more actors 816. The notification 814 may include any type of notification including an email, and auditory alert, a text message, a visual alert (e.g., a flashing light), or any other type of notification. Further, the actors 816 may include one or more users who are authorized to receive the notification 814 or to otherwise access particular information or observations from one or more things with an interactive computing environment 500. In some cases, the actors 816 may include one or more other devices or things instead of or in addition to the one or more users.

Access by the actors 816 to one or more observations or things may be controlled using any type of access control system. For example, security may be based on REST access control actions, such as create, read, update, and delete (CRUD), which enable authorize actors to create new things or observations, read observations, update observations or the configuration of things, and/or delete particular observations or the inclusion of things within the interactive computing environment 500. However, the security of the interactive computing environment 500 is not limited as such and may include other access control provisions.

Example Observation Format

Figures 9A, 9B:
FIGS. 9A and 9B illustrate example observations of certain embodiments of the present disclosure.

FIGS. 9A and 9B illustrate example observations of certain embodiments of the present disclosure. FIG. 9A illustrates an example observation 900 for a particular thing labeled Device5. The example observation 900 illustrates one non-limiting format for an observation. It should be understood that other formats are possible and that the observation may include more or less information about the particular data included within the observation 900. In the illustrated example, the observation 900 identifies the type of the thing as well as its location. Further, the observation 900 identifies the type of data that is included within the observation. It should be understood that the observation 900 may include any other type of information about the particular data included within the observation 900. For example, the observation 900 may indicate the size of the data in memory (e.g., an 8-bit or 16-bit value), a format for the data, a number of significant digits for the data, and error rate or accuracy for the data, a time at which the data was measured, a difference from a previous observation, a number of times or frequency that the data is scheduled to be obtained, and the like.

In some embodiments, observations may be used to identify actions performed by the thing or actions that another thing or system has requested that the target thing execute. FIG. 9B illustrates an example observation 920 for a particular thing labeled Device7. The observation 920 includes the action to be performed at the identified thing. As the observation 920 includes an action to be performed, the observation 920 may also be referred to as a control or command packet. As with the observation 900, the observation 920 may include any type of information to facilitate the execution of the identified action. For example, the observation 920 identifies the type of the thing to execute the action, the location of the thing and they variable or setting that the action is to interact with. For example, the observation 920 may include an action for modifying the variable identified by the observation 920, which may be a particular control value for the thing Device7. Moreover, it should be understood that the observation 920 may include any other type of information that can facilitate the execution of the action included in the observation 920. For example, the observation 920 may identify a number of times perform the action, a user to notify upon success or failure of the action, security information to access or obtain permission to perform the action with respect to the identified thing, alternative actions to perform in response to a success of the action, and the like.

Example Data Transfer Process

Figure 10:
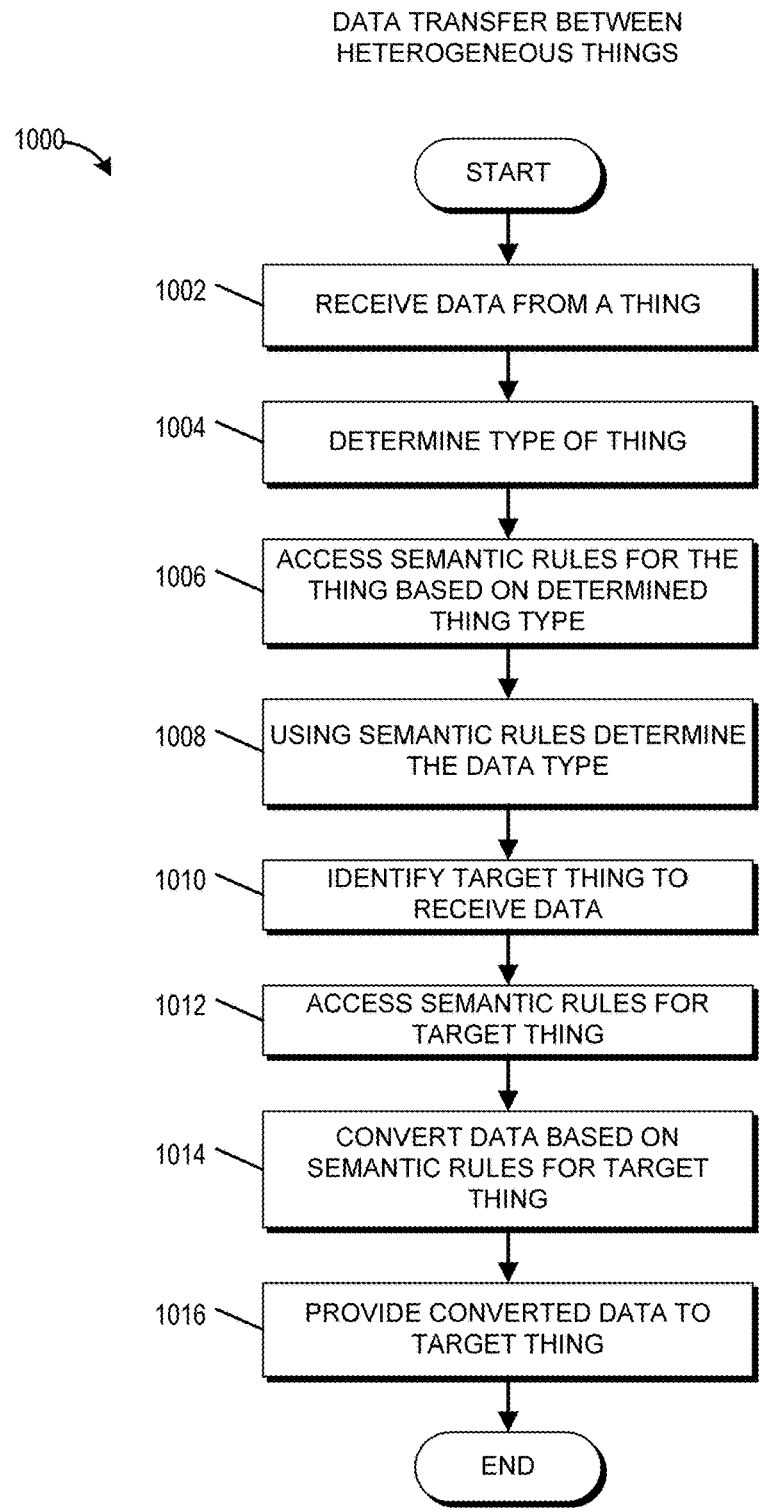
FIG. 10 presents a flowchart of an embodiment of a process for data transfer between heterogeneous things or devices.

FIG. 10 presents a flowchart of an embodiment of a process 1000 for data transfer between heterogeneous things or devices. The process 1000 can be implemented by any system that can transfer data between heterogeneous things. These heterogeneous things may use different communication protocols and/or may format data differently making it infeasible, in some cases, to directly communicate between the heterogeneous things. The process 1000, in whole or in part, can be implemented by a heterogeneous communication gateway, a heterogeneous communication system, or parts thereof (e.g., data processing engine 542). Although any number of systems, in whole or in part, can implement the process 1000, to simplify the discussion, portions of the process 1000 will be described with reference to particular systems.

The process 1000 begins at block 1002 where, for example, the heterogeneous communication gateway 528 receives data from a thing, such as one of the things 510

(e.g., a sensor 516 or a device 522). In some embodiments, as is described in more detail below with respect to FIG. 11, the block 1002 may include accessing an observation. Receiving data from the thing 510 may include querying the thing 510 and/or accessing an exposed interface of the thing 510. For example, the heterogeneous communication gateway 528 may access data exposed to a user interface, may access a machine-readable code, or may otherwise access data from the thing 510. In other embodiments, the data may automatically be received from the thing 510 without the heterogeneous communication gateway 528 requesting the data. In some cases, the data may be received in response to a trigger or on a repeating basis.

At block 1004, the heterogeneous communication gateway 528 determines a type of the thing 510. Determining a type of the thing 510 may include accessing an identifier or other metadata from the thing 510. Further, determining a type of the thing 510 may include accessing a protocol layer 536. In some cases, upon addition of a new thing 510 to the network of things, the things 510 may register with the heterogeneous communication gateway 528. In some such cases, the thing may identify its type upon registration with the heterogeneous communication gateway 528. In some cases, if the type of the thing 510 cannot be determined, a heterogeneous communication gateway 528 may access the heterogeneous communication system 508 to obtain an update to the protocol layer 536 from the protocol repository 550.

At block 1006, the heterogeneous communication gateway 528 accesses semantic rules for the things 510 based on the determined thing type determined at block 1004. The semantic rules may be accessed from the protocol layer 536. Alternatively, or in addition, the semantic rules may be determined from the heterogeneous communication system 508. This may occur, for example, if the protocol layer 536 is incomplete or not up-to-date. The semantic rules may include any rules for identifying how the thing 510 communicates, how data access from the thing 510 is formatted, and any other information that can be used to characterize the data received from the thing 510. Further, the semantic rules may include information for controlling the things 510. For example, the semantic rules may indicate how to adjust a setting of the things 510, such as a temperature setting or a volume setting.

Using the semantic rules, the heterogeneous communication gateway 528 determines at block 1008 the data type for the data access to the block 1002. Determining the datatype may include determining what the data represents (e.g., a weight value, a temperature value, a time, a speed, a location, a color, and the like), determining how the data is represented (e.g., units used, such as Fahrenheit or Celsius for temperature, or pounds or kilograms overweight, and the like), a possible range for the data, and accuracy of the data, and the like.

At block 1010, the heterogeneous communication gateway 528 identifies a target thing to receive the data. This target thing may be another of the things 510 at the entity environment 502 or it may be a thing at another entity environment, such as a thing 512 at the entity environment 504. In yet other embodiments, the target thing may be a system at the heterogeneous communication system 508, such as the sensor network 546 or an observer 544. The target thing may be identified based on information included in the protocol layer 536, in response to a command, based on a configuration of the heterogeneous communication gateway 528, or based on any other method for identifying a target thing for the data.

The heterogeneous communication gateway 528, at block 1012, accesses semantic rules for the target thing identified at the block 1010. The block 1012 can include one or more of the embodiments described with respect to the block 1006.

At block 1014, the heterogeneous communication gateway 528 converts the data received at the block 1002 based on the semantic rules for the target thing accessed at the block 1012. Converting the data received may include converting the format of the data to satisfy the data format of the target thing. Further, converting the data may include modifying how the data is transmitted to the target thing. For example, if the data is received from a thing 510 that uses a communication standard that transmits data 64 kB at a time and is to be provided to a target thing that is capable of receiving 32 kB at a time, and the data may be modified to account for the different size in the data packets. As another example, if the data is received from a thing that communicates using a first wireless standard to a thing that uses a second wireless standard, the data may be converted to optimize the data for transmission using the second wireless standard. In some embodiments, the data is not modified based on the type of communication protocol used by the target thing, but the heterogeneous communication gateway 528 transmits the data based on the communication protocol used by the target thing. Advantageously, in certain embodiments, by using the protocol layer 536 to determine a semantic for communicating data to the target thing, a network of heterogeneous devices that operate using different data formats and/or communication algorithms or standards can be created with minimal or no user interaction with a network.

In some embodiments, converting the data may include converting a messaging format for the data. For example, one thing may list the temperature scale first and then the temperature reading, but another thing may list the temperature reading first and then the temperature scale. As another example, one thing may use a single packet to transmit a temperature reading, while another thing may use two packets (e.g., separating the temperature value and the scaled used to measure the temperature).

At block 1016, the heterogeneous communication gateway 528 provides the converted data to the target thing. Providing the data to the target thing may include transmitting the data over the network 538 to the target thing.

In certain embodiments, one or more operations of the process 1000 may be optional or omitted. For example, if it is determined that the data received at the block 1002 satisfies the semantic rules for the target thing accessed at the block 1012, then the block 1014 may be optional or omitted. In such a case, the block 1016 may include providing her transmitting the data received from the block 1002 to the target thing.

Example Observation Communication Process

Figure 11:
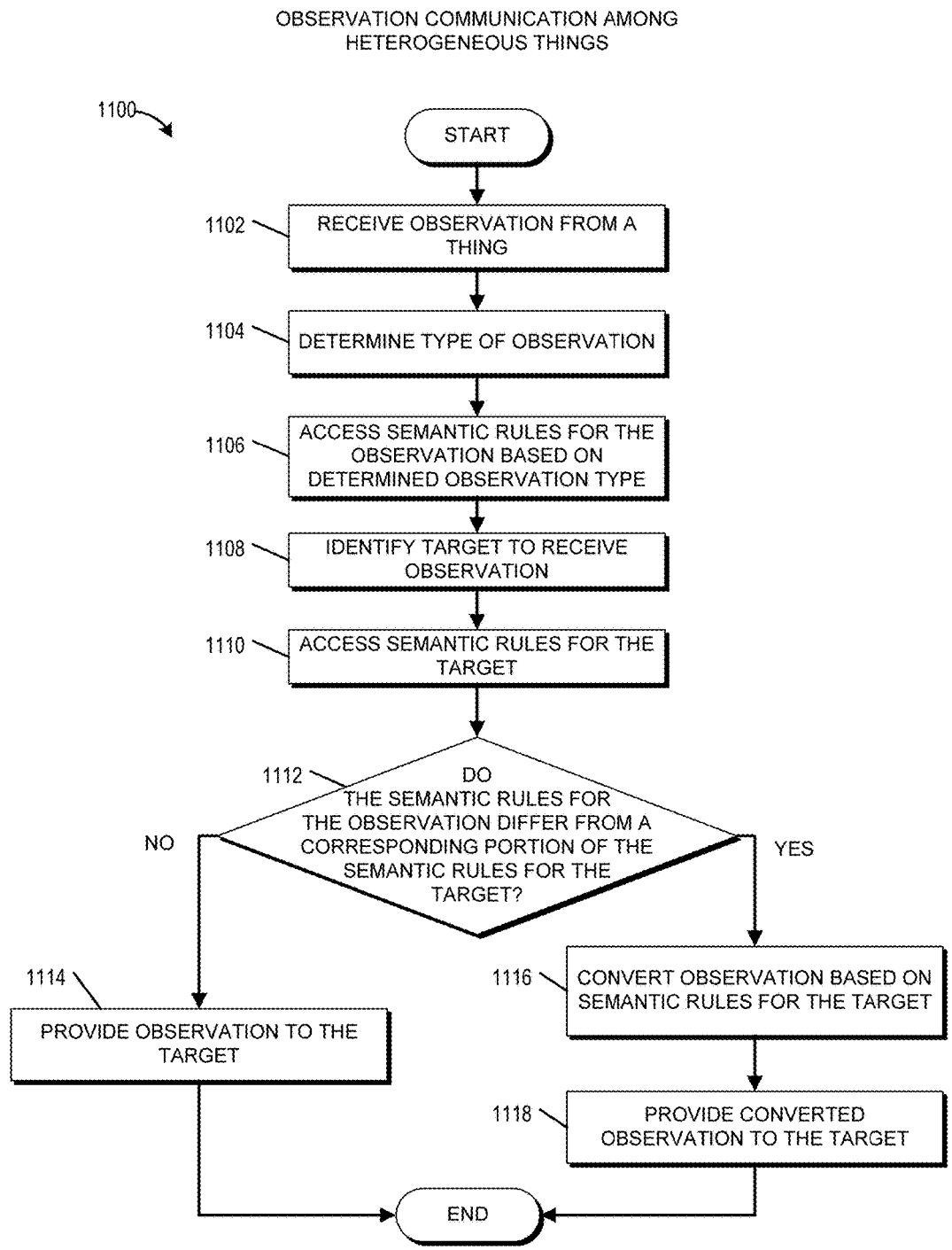
FIG. 11 presents a flowchart of an embodiment of a process for the communication of observations between heterogeneous things or devices.

FIG. 11 presents a flowchart of an embodiment of a process 1100 for the communication of observations between heterogeneous things or devices. The process 1100 can be implemented by any system that can transfer observations between heterogeneous things. These heterogeneous things may use different communication protocols and/or may format observations differently making it infeasible, in some cases, to directly communicate between the heterogeneous things. The process 1100, in whole or in part, can be implemented by a heterogeneous communication gateway, a heterogeneous communication system, or parts thereof (e.g., data processing engine 542). Although any number of systems, in whole or in part, can implement the process 1100, to simplify the discussion, portions of the process 1100 will be described with reference to particular systems.

The process 1100 begins at block 1102 where, for example, the heterogeneous communication gateway 528 receives an observation from a thing, such as one of the things 510. In certain embodiments, the block 1102 may include one or more of the embodiments previously described with respect to the block 1002. However, while at block 1002 data was received from the thing, the block 1102 an observation is received. As previously described, the observation may comprise data and semantic information that can be used to help understand the data. For example, the observation may include identifying the type of data or the accuracy of the data among other things as previously described.

At block 1104, the heterogeneous communication gateway 528 determines a type of the observation. Determining the type of observation may include accessing particular identifiers or tags within the observation. In other words, in some cases, the observation may be self-identifying. Alternatively, or in addition, the type of observation may be determined based on the thing that provided the observation and/or by accessing a protocol layer 536 may include information associated with the things 510 that provided the observation. In some cases, the block 1104 may include one or more of the embodiments previously described with respect to the block 1004.

At block 1106, the heterogeneous communication gateway 528 accesses semantic rules for the observation based on the determined observation type. The block 1106 may include one or more of the embodiments described with respect to the block 1006. The heterogeneous communication gateway 528 identifies a target thing to receive the observation at the block 1108. The block 1108 may include one or more of the embodiments described with respect to the block 1010.

At block 1110, the heterogeneous communication gateway 528 accesses semantic rules for the target thing identified at the block 1108. The block 1110 may include one or more of the embodiments described with respect to the block 1012.

At decision block 1112, the heterogeneous communication gateway 528 determines whether the semantic rules for the observation access to block 1106 differ from a corresponding portion of the semantic rules for the target thing obtained at the block 1110. The corresponding portion of the semantic rules for the target thing may include the semantic rules for processing the observation or otherwise receiving the observation. For example, if the observation received at block 1102 includes temperature data, the corresponding portion of the semantic rules for the target thing may be related to a control at the target thing that is adjusted based on the temperature data. Continuing this example, if the observation received at the block 1102 includes a temperature value measured in Fahrenheit, comparing the semantic rules for the observation with the corresponding portion of the semantic rules for the target thing may include determining if the control of the target thing that is modified based on temperature is configured to receive temperature is a Fahrenheit value or a Celsius value.

If it is determined that the semantic rules for the observation do not differ from a corresponding portion of the semantic rules for the target, the heterogeneous communication gateway 528 provides the observation to the target thing at block 1114. If it is determined at the decision block 1112 that the semantic rules for the observation do differ from a corresponding portion of the semantic rules for the target thing, the heterogeneous communication gateway 528 converts the observation based on the semantic rules for the target at block 1116. Converting the observation may include accessing both the semantic rules for the observation and the semantic rules for the target thing. Further, rules for converting the observation to a format is capable of being received or processed by the target thing may be determined by accessing the protocol layer 536 or a portion of the protocol layer 536 associated with one or more of the observation, the thing that provided the observation, or the target thing. In some embodiments, the block 1116 may include one or more of the embodiments described with respect to the block 1014.

At block 1118, the heterogeneous communication gateway 528 provides the converted observation to the target thing. In certain embodiments, the block 1118 may include one or more embodiments described with respect to the block 1016.

Example Observation Query Process

Figure 12:
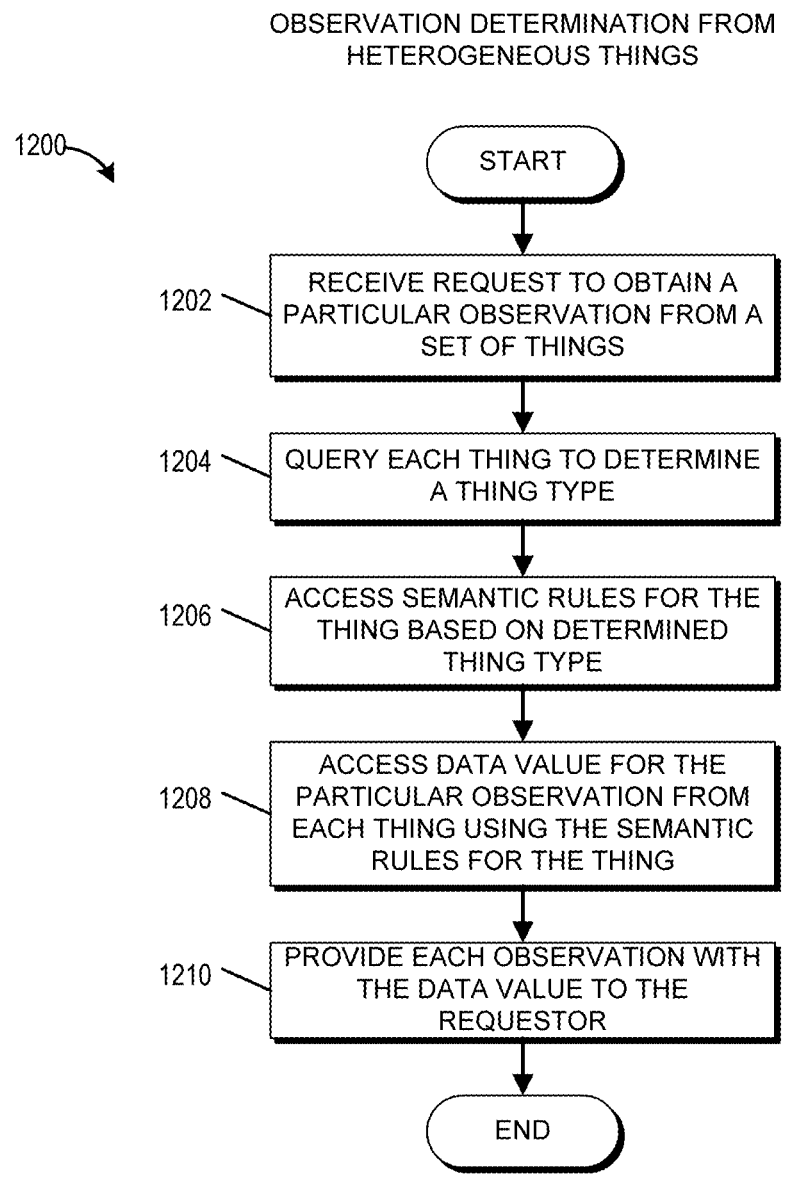
FIG. 12 presents a flowchart of an embodiment of a process for determining an observation from a set of heterogeneous things or devices.

FIG. 12 presents a flowchart of an embodiment of a process for determining an observation from a set of heterogeneous things or devices. The process 1200 can be implemented by any system that can access or generate an observation in response to a query request. The process 1200, in whole or in part, can be implemented by a heterogeneous communication gateway, a heterogeneous communication system, or parts thereof (e.g., data processing engine 542). Although any number of systems, in whole or in part, can implement the process 1200, to simplify the discussion, portions of the process 1200 will be described with reference to particular systems.

The process 1200 begins at block 1202 where, for example, the heterogeneous communication gateway 528 receives a request to obtain a particular observation from a set of things. In some embodiments, the request received at the block 1202 is to obtain a particular item of data from the set of things. The set of things may include any number of things. For example, the set of things may be a set of one thing or a set of the plurality of things. Further, the set of things may be a set of homogeneous things or a set of heterogeneous things. In some embodiments, the request to obtain the particular observation includes the identification of the set of things that is to provide the observation. In other embodiments, the request identifies the particular observation to obtain but may not identify the particular set of things as to provide the observation.

For example, a request may be received to determine the inventory of a warehouse. Thus the requested observation may include accessing a set of storage containers or shelves within the warehouse to obtain a listing of the content within the warehouse. However, the requested observation may or may not identify the containers or shelves or other things within the warehouse that may be able to provide the observation. In such cases, the heterogeneous communication gateway 528 may determine the set of things to access in order to determine the particular observation. The heterogeneous communication gateway 528 may determine the set of things to access by accessing the registration of things stored at the heterogeneous communication gateway 528 and/or stored at the thing repository 554. In some cases the registration of things may identify the things within a particular entity environment 502, such as the warehouse of the previous example. Further, in some cases, the heterogeneous communication gateway 528 may access a particular identified thing within the entity environment (e.g., the warehouse) to determine the existence of other things within the entity environment including things that may be capable of providing the observation requested in the request received at the block 1202.

At block 1204, the heterogeneous communication gateway 528 queries each thing to determine a type of the thing. In some embodiments, the block 1204 is optional or omitted. For example, the request received at the block 1202 may identify the type of each thing to be access to obtain the observation.

At block 1206, the heterogeneous communication gateway 528 accesses semantic rules for the thing based on the determined thing type. As previously described the semantic rules may be accessed from the protocol layer 536 at the heterogeneous communication gateway 528 and/or from a protocol repository 550.

Using the semantic rules for the thing, the heterogeneous communication gateway 528 accesses a data value for the particular requested observation from each thing. By using the semantic rules for the thing, the heterogeneous communication gateway 528 can determine how to access the particular data value at the thing. For example, the semantic rules may identify a command to provide to the thing to access the requested data. As another example, the semantic rules may identify the format of the data enabling the heterogeneous communication gateway 528 to translate or to convert the data to provide the particular requested observation.

At block 1210, the heterogeneous communication gateway 528 provides each observation obtained from each thing from the set of things to the thing or system that provided the request at block 1202. In some embodiments, the block 1210 aggregates the received data received from the set of things into a single observation. Further, the block 1210 may include creating the observation from the data obtained from the set of things. For example, the heterogeneous communication gateway 528 may obtain a set of data values from a set of things that correspond to item identifications. The heterogeneous communication gateway 528 may use these item identifications to create the observation that indicates the types of the items within the entity environment and the number of items within the entity environment. As another example, the heterogeneous communication gateway 528 may access a number of numeric values from the things and create one or more observations that include the numeric values and metadata identifying the numeric values as temperature measured using a Fahrenheit temperature scale.

In some embodiments, providing the observation to the requester may include converting the observation into a format that the requester can process. This format may be determined by accessing semantic rules associated with the requester. Further, the heterogeneous communication gateway 528 may access the protocol layer 536 to determine a format for the observation to provide to the requester of the observation and/or a type of communication protocol to use to transmit the observation to the requester.

Example Process for Triggering an Action

Figure 13:
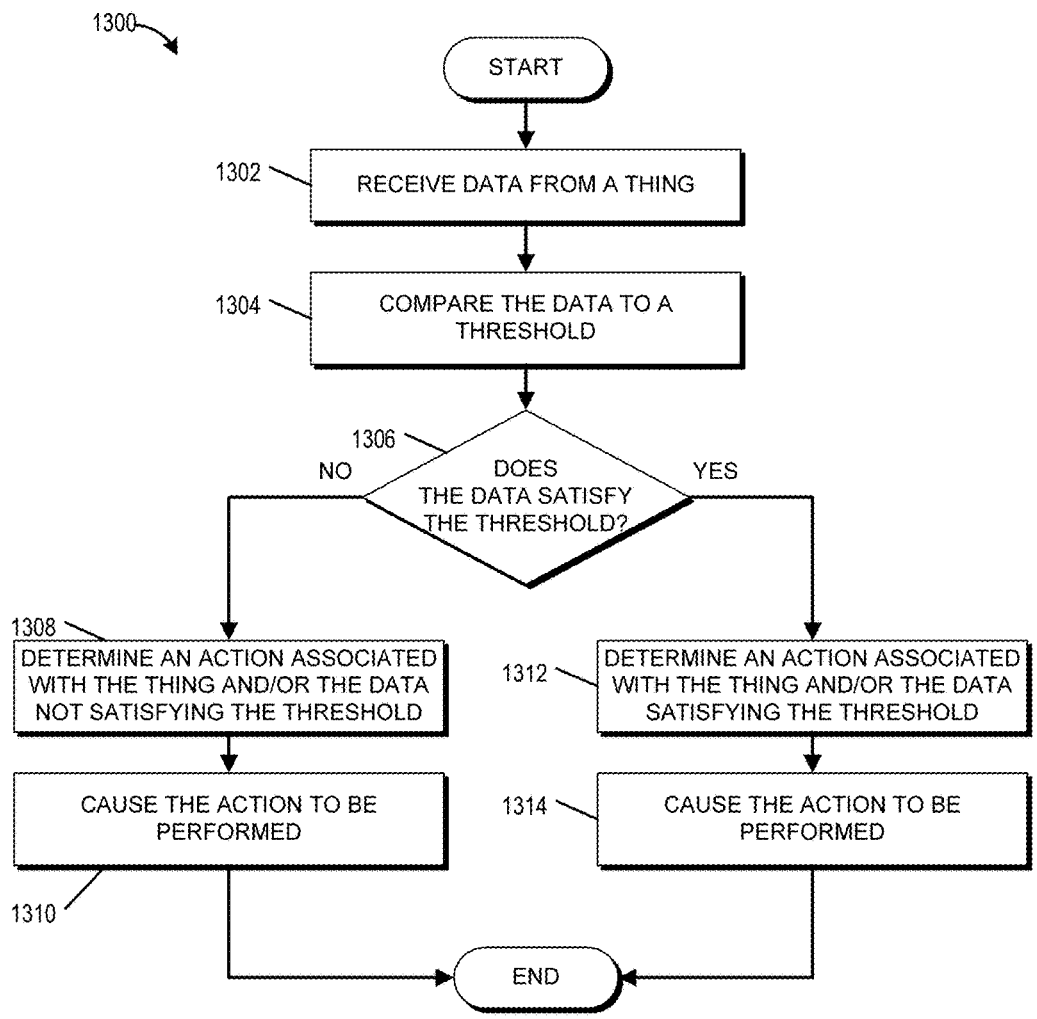
FIG. 13 presents a flowchart of an embodiment of a process for performing an action in response to a trigger.

FIG. 13 presents a flowchart of an embodiment of a process 1300 for performing an action in response to a trigger. The process 1300 can be implemented by any system that can trigger an action in response to determining that data or an observation satisfies or does not satisfy a criterion. The process 1300, in whole or in part, can be implemented by a heterogeneous communication gateway 528, a data processing engine 542, an observer 544, a heterogeneous communication system 508, or parts thereof. Although any number of systems, in whole or in part, can implement the process 1300, to simplify the discussion, portions of the process 1300 will be described with reference to particular systems.

The process 1300 begins at block 1302 where, for example, one or more observers 544 receive data from the thing, such as one of the things 510. Although the data is generally generated by one of the things 510, the data may be received from a heterogeneous communication gateway 528 receives data from the thing 510. Further, the data may be provided by the thing 510 and/or the heterogeneous communication gateway 528 via the network 510. Moreover, in some cases, receiving the data may include receiving an observation that includes the data and a semantic associated with the data. In certain embodiments, the data and/or observation is received at a sensor network 546. The sensor network 546 may collect multiple data and/or observations from a thing 510 and/or from multiple things 510. This data and/or observations may be individually made accessible to one or more observers 544 and/or may be aggregated to form a single data or observation item that is made accessible to one or more of the observers 544. In some embodiments, the data and/or observation is received at the data processing engine 542.

At block 1304, one or more of the observers 544 compare the data received at block 1302 to a threshold value. In certain embodiments, the data is compared to multiple threshold values. The one or more threshold values may be selected based on the type of data and/or the semantic information included in the observation that includes the data. Further, the threshold values may depend on the thing 510 that provided the data and/or observation. Thus, in some cases, the same type of data may have differing thresholds based at least in part on the thing that provided the data, or in some cases, the entity environment that includes the thing. Moreover, the one or more thresholds may vary based on any type of application specific factor. For example, in some cases, the one or more thresholds may vary based on an entity associated with the thing, a particular user, a time of day, a geographic location, a time of year, a number of things included within an entity environment, and the like.

In certain embodiments, the data may be measured against one or more criteria other than a threshold value. For example, the data may be measured against one or more possible values for the data. For example, a data value associated with color may be compared against different color options. As another example, a data value associated with a type of item or cargo, or features thereof, may be compared against different item or cargo options, features thereof.

At decision block 1306, one or more observers 544 determine whether the data satisfies the threshold. Determining whether the data satisfies the threshold may include determining whether the data is above the threshold, below the threshold or equals the threshold. Further, certain embodiments, the decision block 1306 may include determining whether the data satisfies and/or matches one or more other criteria for the data. For example, extending the examples of the previous paragraph, the decision block 1306 may include determining which color option the data specifies and/or the item or cargo type specified by the data value.

If it is determined at decision block 1306 that the data does not satisfy a threshold, and/or criteria associated with the data, the data processing engine 542 determines an action associated with the thing that provided the data and/or the data itself that does not satisfy the threshold. In some embodiments, the action may be to take no action. In other embodiments, the action may be to notify a user for another system of the data value and/or the relationship of the data value to the threshold or other criteria. In some cases, the action may include a command to take an action at the thing that provided the data at the block 1302 or some other thing at one or more of the entity environments. For example, the action may include a command to deactivate the thing or modify a configuration or setting at the thing. In some embodiments, the data processing engine 542 determines the action in response to the observer 544 providing a trigger or otherwise alerting the data processing engine 542 of the relationship between the data of the threshold for other criteria.

At block 1310, the data processing engine 542 causes the action determined at block 1308 to be performed. Causing the action to be performed may include formatting a command and/or causing the command to be transmitted using a particular communication protocol for the target thing that is to receive the command. The determination of the format for the command and/or the communication protocol to use to transmit the command to the target thing may be determined by accessing a protocol layer at the protocol repository 550.

If it is determined at decision block 1306 that the data does satisfy a threshold, and/or criteria associated with the data, the data processing engine 542 determines an action associated with the thing that provided the data and/or the data itself that does satisfy the threshold. In certain embodiments, the block 1312 may include one or more of the embodiments described with respect to the block 1308.

At block 1314, the data processing engine 542 causes the action selected at the block 1312 to be performed. In certain embodiments, the block 1314 may include one or more of the embodiments described with respect to the block 1310.

Although the process 1300 is described with respect to a binary decision (e.g. a determination as to whether the data satisfies or does not satisfy a threshold), the process 1300 is not limited as such. As previously described, the data may be compared to a plurality of threshold and/or a plurality of different criteria. Based on the one or more thresholds satisfied by the data and/or the one or more criteria satisfied by the data, one or more different actions may be initiated by the data processing engine 542. Thus, the decision block 1306 may result in a plurality of decision branches rather than to decision branches. For example, the data may be compared against five different criteria options and based on the satisfied option one of five different actions may be selected. Further, in certain embodiments, one or more of the blocks 1308 and 1312 may result in the determination of multiple actions to be performed.

Advantageously in certain embodiments, by monitoring data and/or observations at the heterogeneous communication system and having the data processing engine 542 determine one or more actions to initiate, computing resources may be reduced within a network of things. The computing resources may be reduced, for example, because the computing resources of the heterogeneous communication system may be shared among multiple portions of the Internet of things at multiple entity environments and/or among multiple different Internet of things, or network of things.

Example Action Formatting Process

Figure 14:
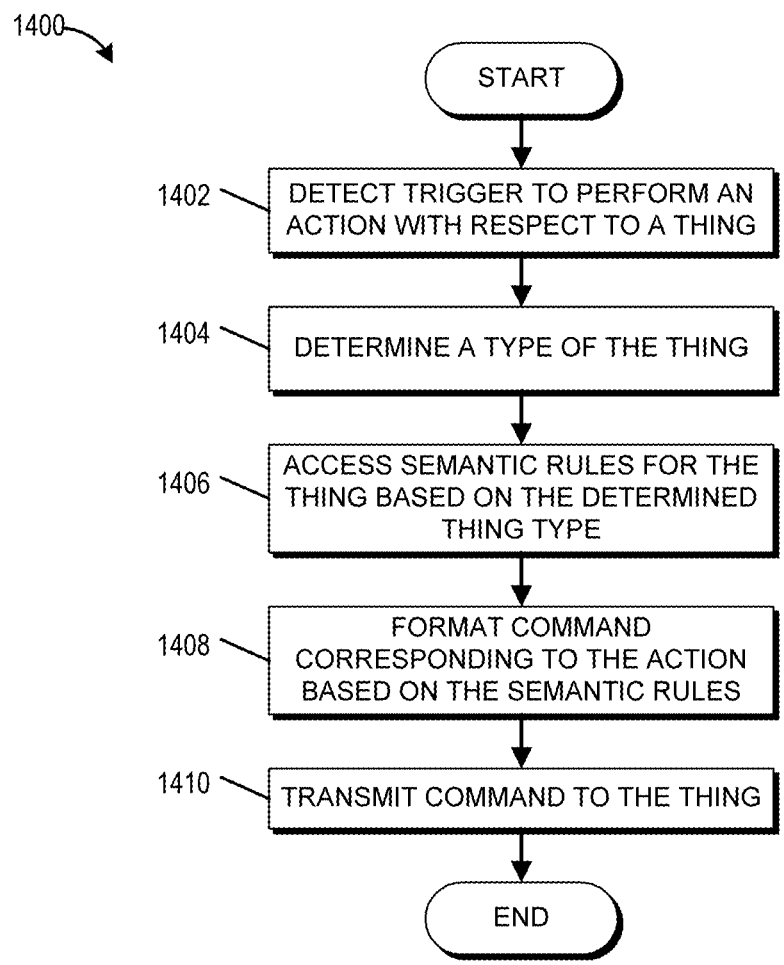
FIG. 14 presents a flowchart of an embodiment of a process for formatting a triggered action for a particular thing.

FIG. 14 presents a flowchart of an embodiment of a process 1400 for formatting a triggered action for a particular thing. The process 1400 can be implemented by any system that can format a triggered action or command based on semantic rules for a target thing 510 that is to receive the command or action. The process 1400, in whole or in part, can be implemented by a heterogeneous communication gateway 528, a data processing engine 542, an observer 544, a heterogeneous communication system 508, or parts thereof. Although any number of systems, in whole or in part, can implement the process 1400, to simplify the discussion, portions of the process 1400 will be described with reference to particular systems.

The process 1400 begins at block 1402 where, for example, the data processing engine 542 detects a trigger to perform an action with respect to a thing 510. In some embodiments, the trigger is provided by an observer 544 in response to the observer 544 determining that a monitor data item or observation satisfies or does not satisfy one or more thresholds were criteria. The determination of whether to perform an action is described it in further detail with respect to the process 1300.

At block 1404, the data processing engine 542 determines a type of the thing 510 that is to receive the action or command. Determining a type of the thing 510 may include accessing a protocol layer from the protocol repository 550 and/or accessing a listing or registration of things at the thing repository 554. Further, determining the type of thing 510 may include performing one or more of the embodiments described with respect to the block 1004.

At block 1406, the data processing engine 542 accesses semantic rules for the thing 510 based on the determined thing type. The semantic rules may be accessed from the protocol repository 550 and/or from the thing repository 554.

At block 1408, the data processing engine 542 formats the command corresponding to be action based on the semantic rules. Formatting the command may include formatting or structuring the command to satisfy the thing 510. In some cases, the command is formatted based on an application programmer interface (API) associated with the target thing 510. Further, in some embodiments, formatting the command may include identifying a communication protocol supported by the thing 510 and formatting the command for transmission using the selected communication protocol.

The data processing engine 542 transmits the command to the thing 510 at block 1410. Transmitting the command may include transmitting the command using the communication protocol associated with thing 510. Further, transmitting the command may include sending the command to a heterogeneous communication gateway 528 with an identity of one or more things 510 to receive the command. As previously described, the command may include any type of action or command that may be performed by one or more things 510. For example, the command may include a command to modify a value at the thing 510 to perform a particular action using features of the thing 510. In some cases the command may include performing one or more API process calls associated with the thing 510.

In certain embodiments, some or all of the process 1400 is performed at the heterogeneous communication gateway 528. For example, at block 1402, the data processing engine 542 may provide the triggered action and the identity of the one or more things to receive the triggered action to one or more heterogeneous communication gateways. These one or more heterogeneous communication gateways may then perform the remainder of the process 1400 so as to provide the command to one or more things within the entity environment associated with the heterogeneous communication gateways. Thus, to determine the communication protocol and/or format for the command, the heterogeneous communication gateway may access the protocol layer 536.

Example Thing Addition Process

Figure 15:
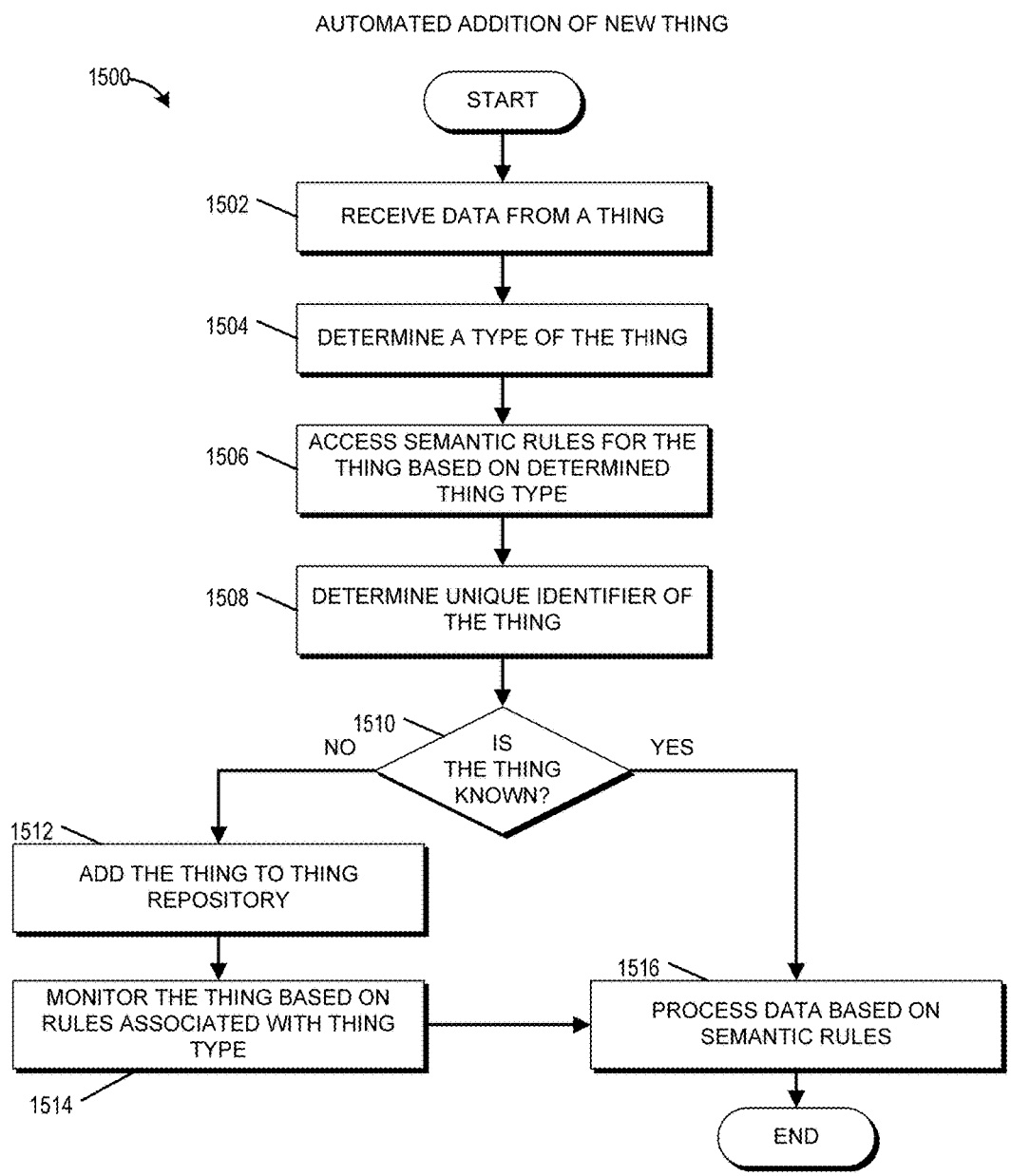
FIG. 15 presents a flowchart of an embodiment of a process for the automated addition of a new thing.

FIG. 15 presents a flowchart of an embodiment of a process 1500 for the automated addition of a new thing. The process 1500 can be implemented by any system that can add a new thing to a network or Internet of things. The process 1500, in whole or in part, can be implemented by a heterogeneous communication gateway 528, a data processing engine 542, an observer 544, a heterogeneous communication system 508, or parts thereof. Although any number of systems, in whole or in part, can implement the process 1500, to simplify the discussion, portions of the process 1500 will be described with reference to particular systems.

The process 1500 begins at block 1502 where, for example, a heterogeneous communication gateway 528 receives data and/or an observation from a thing 510. In some embodiments, the block 1502 may lose receiving a request to register the thing with the heterogeneous communication gateway 528. At block 1504, the heterogeneous communication gateway 528 determines a type of the thing. Determining the type of the thing may be based at least in part on a protocol layer 536 and/or identification information provided by the thing 510. Determining the type of the thing may include one or more of the embodiments described with respect to one or more of the blocks 1004 and 1404.

At block 1506, the heterogeneous communication gateway 528 accesses semantic rules for the thing 510 based on the determined thing type. The semantic rules may be accessed from the protocol layer 536. In some embodiments, the block 1406 may include one or more of the embodiments described with respect to the blocks 1006 or 1406.

At block 1508, the heterogeneous communication gateway 528 determines a unique identifier of the thing 510. Determining the unique identifier may include querying the thing 510, accessing one or more data items or observations from the thing 510, and/or accessing a registration list of the things 510 at the heterogeneous communication gateway 528 and/or at the thing repository 554 of the heterogeneous communication system 508.

The heterogeneous communication gateway 528 determines whether the thing is known at decision block 1510. Determining whether the thing is known may include comparing the unique identifier of the thing 510 to a list or other data structure of things stored at the heterogeneous communication gateway 528, at the heterogeneous communication system 508, or at the thing repository 554. In certain embodiments, the thing 510 may declare to the heterogeneous communication gateway 528 that the thing 510 is new or unknown by the heterogeneous communication gateway 528.

If it is determined at the decision block 1510 that the thing 510 is unknown or not registered with one of the heterogeneous communication gateway 528 or the heterogeneous communication system 508, the heterogeneous communication gateway 528 adds the thing 510 to a thing repository. This thing repository may be at the heterogeneous communication gateway 528 and/or may be the thing repository 554. In some cases, registering the thing may include registering the thing at the heterogeneous communication gateway 528 and at the heterogeneous communication system 508. In some cases, the thing may be registered at multiple heterogeneous communication gateways. For example, in the case of the entity environment 502, multiple heterogeneous communication gateways exist. In some cases each heterogeneous communication gateway may be associated with a unique subset of the things 510. In such cases, the thing 510 may be registered with a single heterogeneous communication gateway 528. However, in cases where the things 510 registered with the heterogeneous communication gateways are not unique, the new thing 510 may be registered with multiple heterogeneous communication gateways.

Adding the new thing to the thing repository may include registering the unique identifier of the thing at the thing repository. Further, adding the new thing the thing repository may include registering the thing type and/or semantic rules associated with the new thing at the thing repository. In some cases, the semantic rules associated with the thing may be provided by the new thing. Further, if the semantic rules associated with the new thing are unique to the new things or have not previously been included in the protocol layer 536, the protocol layer 536 may be updated with the semantic rules for the new thing or for the type of the new thing.

At block 1514, the heterogeneous communication gateway 528, the sensor network 546, and/or the observers 544 may monitor the new thing based on the rules associated with the thing type of the new thing. Further, at the block 1516, the heterogeneous communication gateway 528, the sensor network 546, the observers 544, and/or the data processing engine 542 may process data for the new thing based on the semantic rules associated with the new thing.

If it is determined at the decision block 1510 that the thing is known, the process 1500 proceeds to the block 1516 where data received from the thing is processed based on semantic rules associated with the things and/or the thing type.

In some embodiments, the process 1500 is performed by the heterogeneous communication system 508. If it is determined that the thing is unknown or a new thing, the heterogeneous communication system 508 using, for example, the system configurator 548 may register the new thing with one or more heterogeneous communication gateways at the entity environment that includes the new thing.

Advantageously, the process 1500 enables a new thing to be automatically added to a network or Internet of things without user involvement. However, in certain embodiments, a user may be requested to confirm the addition of a new thing. Requesting that the user confirm the addition of the new thing may be used to confirm the accuracy of the identification of semantic rules associated with the new thing and/or for security related purposes. For example, before a new thing is added to a network of things, a user may be requested to confirm that the new thing is authorized to be included in the network of things. In certain embodiments, adding the new things to the network of things may include identifying permissions for the new thing and/or identifying the users or other systems that are authorized to access the new thing.

Example Access Control

Figure 16:
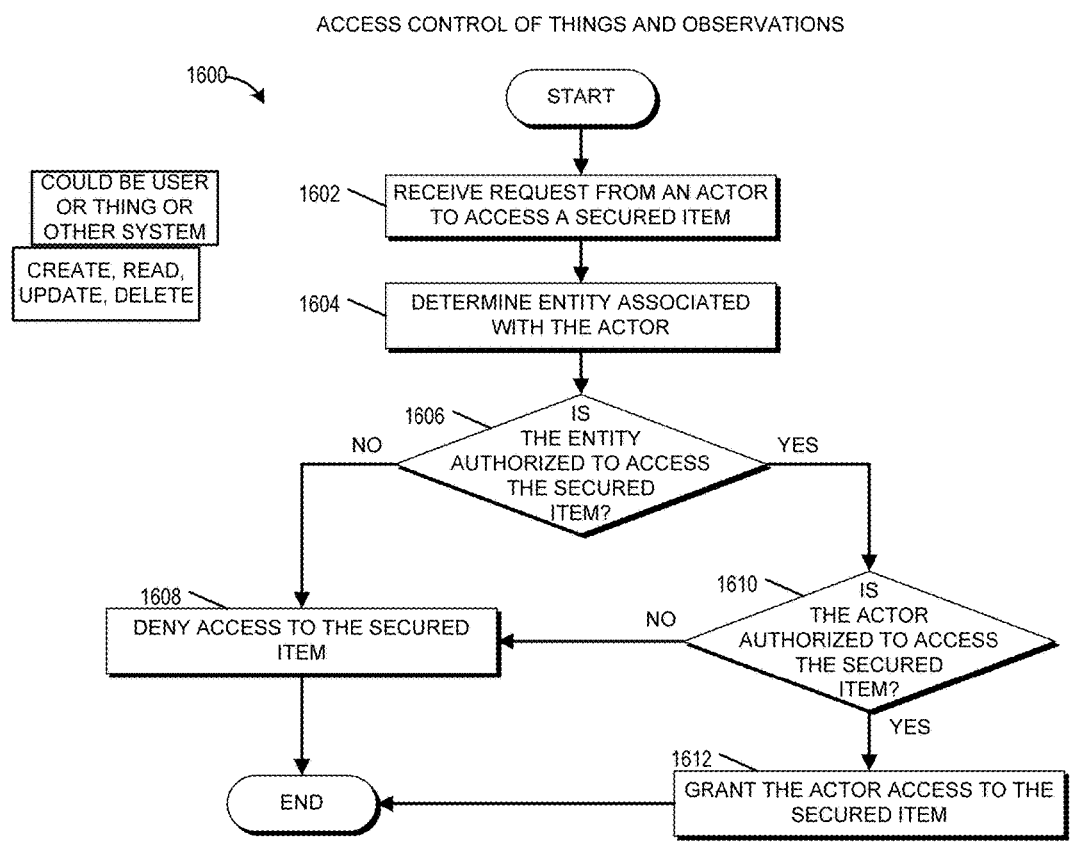
FIG. 16 presents a flowchart of an embodiment of a process for the access control of things and observations.

FIG. 16 presents a flowchart of an embodiment of a process 1600 for the access control of things and observations. The process 1600 can be implemented by any system that can regulate access to a thing, data, or an observation. The process 1600, in whole or in part, can be implemented by a heterogeneous communication gateway 528, a data processing engine 542, an observer 544, a user interface system 540, a heterogeneous communication system 508, or parts thereof. Although any number of systems, in whole or in part, can implement the process 1600, to simplify the discussion, portions of the process 1600 will be described with reference to particular systems.

The process 1600 begins at block 1602 where, for example, the heterogeneous communication system 508 receives a request from an actor to access a secured item.

The request may be received at the user interface system 540 of the heterogeneous communication system 508. Alternatively, or in addition, the request may be received at one of the heterogeneous communication gateways in one of the entity environments. The request may be received from a user, one of the things 510, or another computing system. Further, the request may be to access one of the things 510, one or more observations, one or more data items, or a notification. Further, the request may be a CRUD command (e.g., to create, read, update, or delete the secured item), or any other type of requested access.

At block 1604, the heterogeneous communication system 508 determines an entity associated with the actor. In some embodiments, the entity can be a null set, a non-entity, or an identity of the individual user as the entity. Alternatively, or in addition, the block 1604 may be optional or omitted during performance of the process 1600 or in response to a determination that the actor generated to request independently of an entity.

In embodiments where the request is received or generated independent of an entity, process 1600 may proceed to decision block 1610. However, embodiments where an entity is successfully identified, the process 1600 proceeds to the decision block 1606 where the heterogeneous communication system 508 determines whether the entity is authorized to access the secured item. Determining whether the entity is authorized to access the secured item may include accessing metadata associated with the entity at the actor repository 552 and determining whether the metadata satisfies security permissions for the secured item. This metadata may include any information associated with the entity that can be used to determine the entity's authorization to access one or more things and/or observations. For example, the metadata may include an identity of the entity, a role of the entity, a service level of the entity, a credit balance for the entity, a set of granted authorizations for the entity, and the like.

If it is determined that the entity is not authorized to access the secured item the process 1600 proceeds to the block 1608 where the heterogeneous communication system 508 denies access to the secured item. Denying access to the secured item may include informing the actor that the actor has been denied access to the secured item. Further, the block 1608 may include alerting one or more systems or actors of the attempt to access the secured item.

If it is determined at the decision block 1606 that the entity is authorized to access the secured item, the process 1600 proceeds to the decision block 1610 where the heterogeneous communication system 508 determines whether the actor is authorized to access the secured item. Determining whether the actor is authorized access the secured item may include accessing metadata or permissions associated with the identified actor at the actor repository 552. Further, the decision block 1610 may include requesting credentials of the actor, such as a username, a password, a role, or any other information for confirming the identity of the actor. In some cases, the decision block 1610 includes determining the type of access that the actor is permitted. Thus, the decision block 1610 may determine that an actor is not authorized to access the secured item if the type of access exceeds the permissions associated with the actor.

If it is determined at the decision block 1610 that the actor is not authorized to access the secured item, or if the level of authorization is not sufficient to grant the request received at the block 1602, the process proceeds to the block 1608 and access is denied to the secured item. If on the other hand the actor is authorized to access the secured item, the process proceeds to the block 1612 where the heterogeneous communication system 508 grants the actor access to the secured item. Granting the actor access of the secured item may be based at least in part on the requested type of access in the permissions associated with the actor.

Security may exist at a variety of levels. For example, access control may be applied to accessing a thing or data generated by the thing. Further, access control may be applied on a user or actor basis, or at an entity-level basis. Further, particular things may have multiple access control permissions. For example, different permissions may exists for a registered user, a guest user, a registered entity, or a guest entity.

Example Use Case

Figure 17:
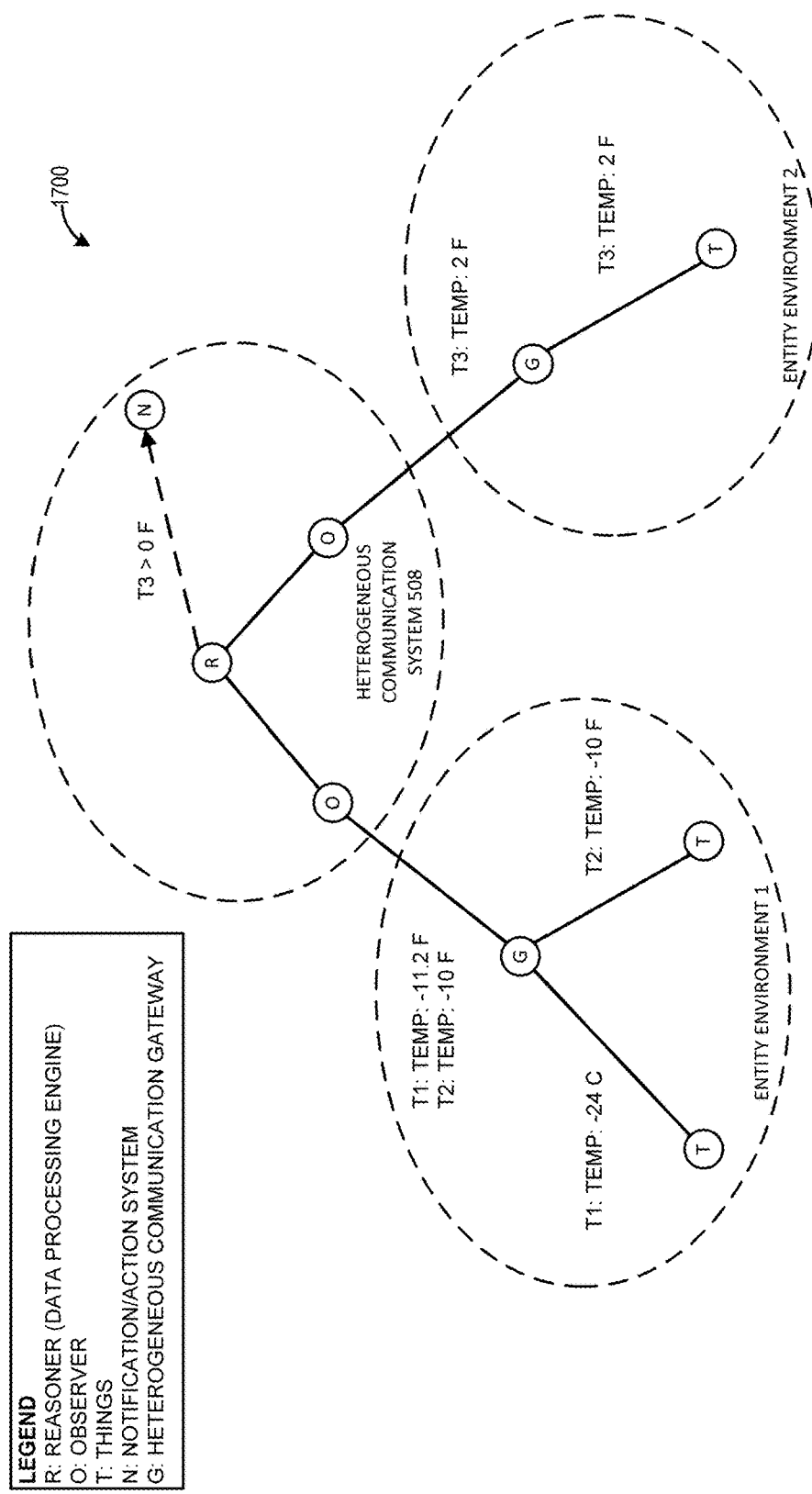
FIG. 17 illustrates an example tree diagram for an example use case of embodiments of the present disclosure.

FIG. 17 illustrates an example tree diagram 1700 for a non-limiting example use case of embodiments of the present disclosure. In the particular example of FIG. 17, a pair of entity environments include a set of things that are capable of communicating a temperature value. These things may be thermometers, thermostats, or any other sensor or device that could produce a temperature reading, such as a CPU, a vehicle, a smart appliance, etc. In this example, the two things of the entity environment 1 present the temperature data using different formats. For example, the thing on the left provides a Celsius temperature reading and the thing on the right of the entity environment 1 provides a Fahrenheit temperature reading.

The temperature readings may be provided to the heterogeneous communication gateways, which are included in the entity environments. Using the protocol layer of the heterogeneous communication gateway, the heterogeneous communication gateway converts the T1 temperature readings from Celsius to Fahrenheit. The temperature readings may then be provided to the heterogeneous communication system 508 via the observers of the heterogeneous communication system 508. Thus, advantageously, in certain embodiments the protocol layer enables different types of devices that may measure or present data differently to be included within the same network.

In this particular use case example if a temperature reading exceeds 0° F. an alert is generated. Thus, one of the observers may alert the reason that the temperature T3 has exceeded the 0° F. threshold. Alternatively, the reasoner may determine by accessing the observation at the observers that the temperature threshold has been exceeded. The reasoner (e.g., the data processing engine 542) may then generate an alert or cause a notification or action system to generate an alert indicating that the temperature has exceeded the threshold. Thus, assuming for example that the temperature sensors are included on a cargo delivery vehicle, a user can be notified that the cargo may not have been maintained at a required temperature, thereby enabling the user to reject the cargo and/or initiate a vehicle repair process for the vehicle.

Although the example tree diagram 1700 is presented to facilitate explaining an example use case, certain embodiments, the tree diagram 1700 may also be presented to a user as part of a user interface. The user may view the tree diagram to identify the location of particular things with respect to different environments in the operational status of the things.

Example Map User Interface

Figure 18:
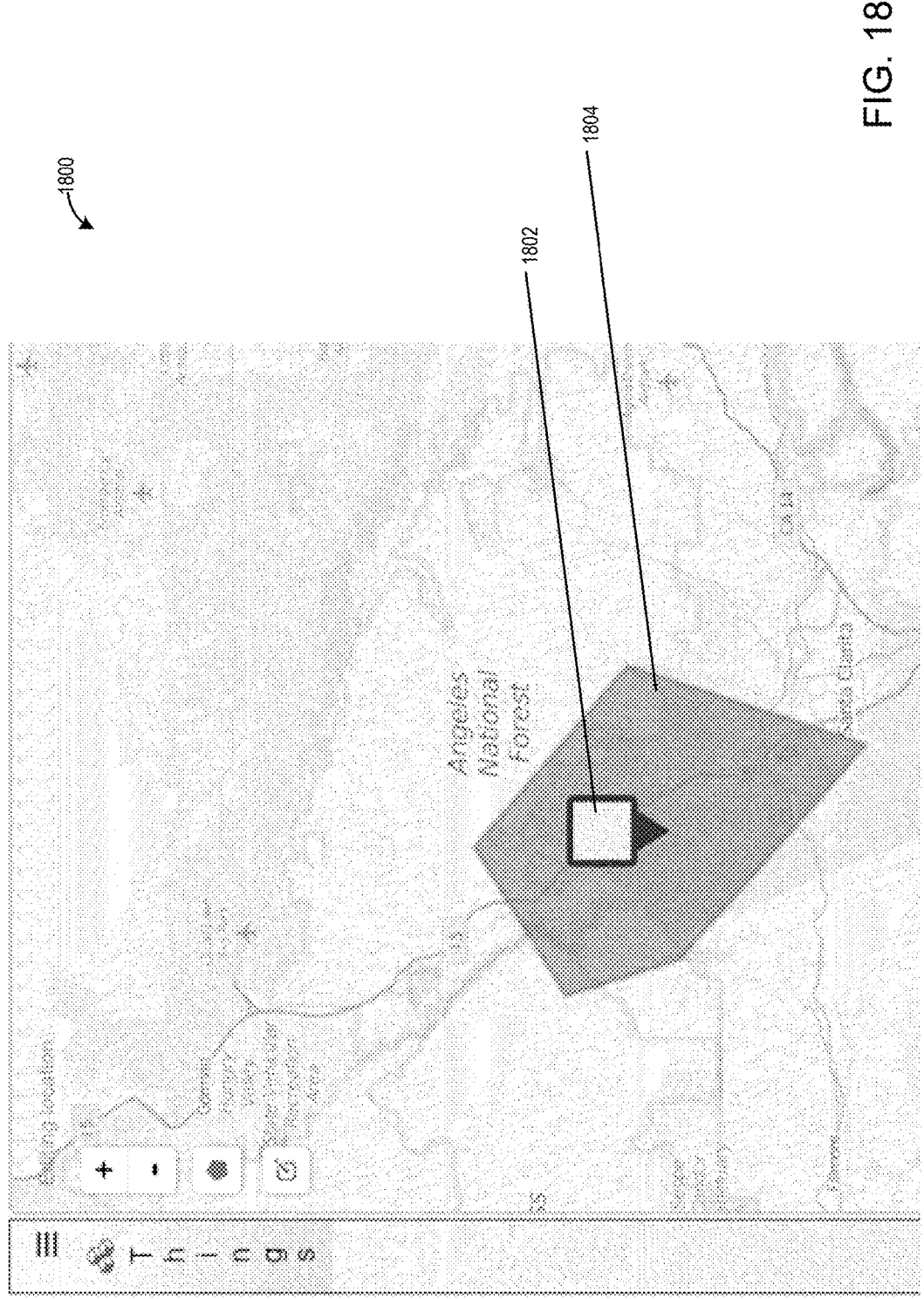
FIG. 18 illustrates an example map user interface for an example use case of embodiments of the present disclosure.

FIG. 18 illustrates an example map user interface 1800 for an example use case of embodiments of the present disclosure. The map user interface 1800 may be used to identify the location of a thing or set of things 1802 within a particular environment, such as a geo-fenced area 1804. The geo-fenced area 1804 may include an area that is conceptually bounded, or that is bounded by a set of sensors, but which may or may not include a physical fence that prevents the passage of an actor or thing. A user may access the map user interface 1800 via the user interface system 540.

Advantageously, in certain embodiments, the map user interface 1800 can be used to determine when tracked things have left a particular geo-fenced area. Some example use cases may include determining whether a driver of a fleet vehicle has left an expected area or made an unexpected detour, whether a set of farm animals has left an expected area (e.g., when sheep have left a particular grazing area or a fenced area of a farm), whether a set of cargo has left a manufacturing plant or a delivery warehouse, and the like.

Example Observation User Interface

Figure 19:
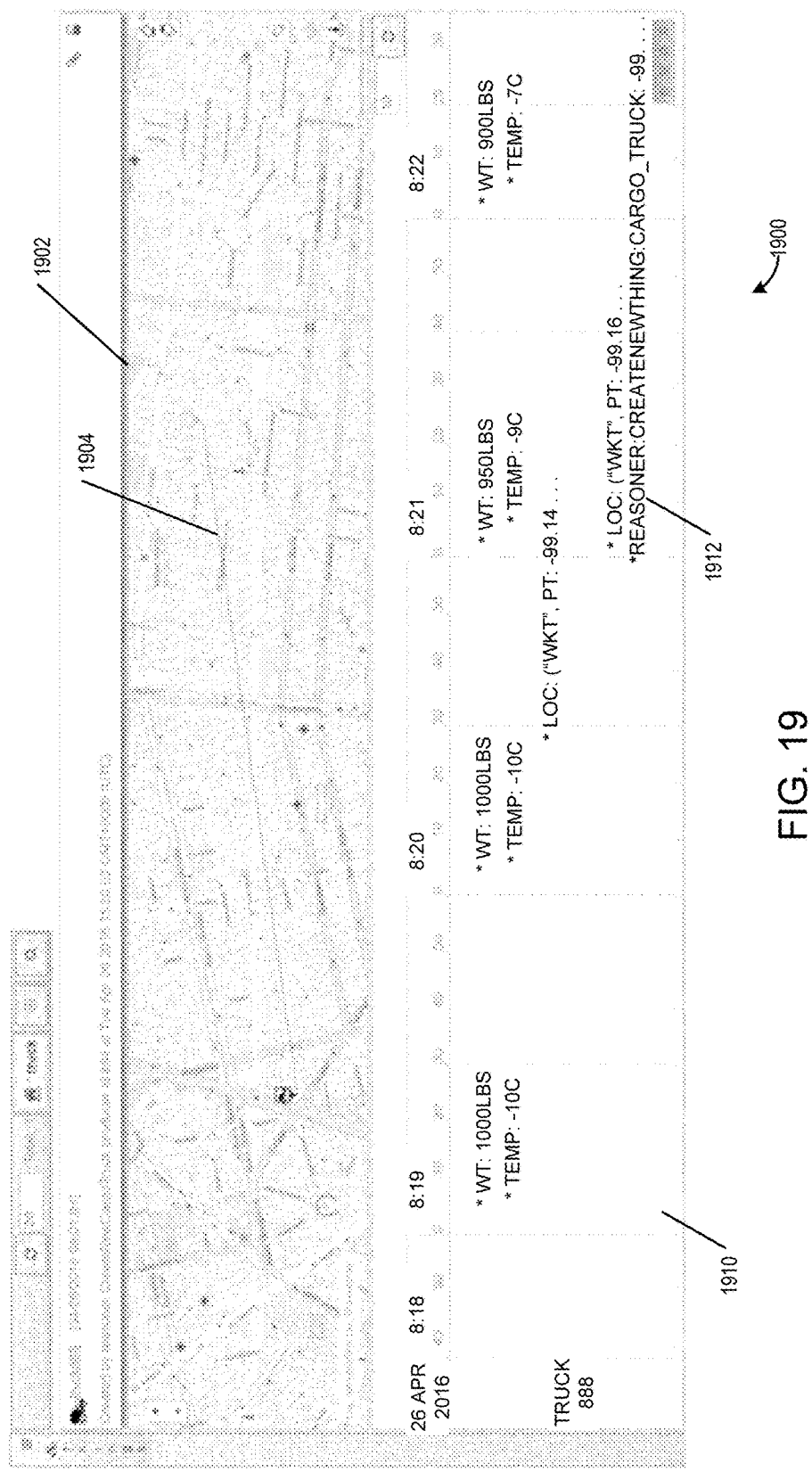
FIG. 19 illustrates an example observation user interface for an example use case of embodiments of the present disclosure.

FIG. 19 illustrates an example observation user interface 1900 for an example use case of embodiments of the present disclosure. In the example of FIG. 19, a truck 888 is monitored for its cargo weight and the temperature of the cargo compartment. At time 8:19, the weight of the cargo is 1000 lbs, and the temperature is −10 C. The same values are measured at 8:20. At 821, the cargo weight drops to 950 lbs and the temperature rises to −9 C. At the same time, the reasoner (or data processing engine 542) is provided with the location of the truck 888 and may determine that the truck has entered a particular entity environment (e.g., a warehouse, a delivery location, a distributor, etc.). The reasoner may add the truck to the entity environment as illustrated by the "createnewthing" command.

Thus, in this example use case, an observer may track the weight and temperature of the truck 888. Further, the observer, or another observer, may track the location of the truck 888. If the change in temperature and weight occurs in an expected geographic location, the observer may take no action. However, if the change in temperature and weight occurs in an unexpected location, the observer may trigger and alert and the reasoner may cause a notification to be sent to a user.

As illustrated, the user interface 1900 may include a map section 1902 that can display the location of the truck 888 (e.g., the line of travel 1904). Further, the user interface 1900 may include an observation panel 1910 that can present observations of temperature (e.g., temperature data and units of measurement data) and cargo weight data (e.g., weight data and unit of measurement data) to a user. Further, the observation panel 1910 may also present a history of commands or actions that were automatically executed or initiated by the reasoner as illustrated by the "createnewthing" command 1912 initiated at time 8:21.

In certain embodiments, the user interface 1900, or particular items included in the user interface 1900, may be presented to authorized users after confirming the identity of the user. Similarly, in certain embodiments, the user interface 1900 may be accessible by particular entities, or entity representatives, but not others.

Example Implementation of an Observation

FIG. 20 illustrates an example of an actual implementation of an observation 2000 that includes data and semantic information in accordance with embodiments of the present disclosure. As illustrated, the observation 2000 can include an identification 2002 of a communication standard used by the thing that provided the observation. In this example, the thing is using the Eddystone™ protocol that defines an implementation of Bluetooth® low energy (BLE). Further, the observation 2000 can identify both users via, for example, the guest users identifier 2006 and entities via, for example, the guest tenants identifier 2012 who can access the observation. In addition, the observation can identify the things that are authorized to receive the observation via, for example, the target things identifier 2004. Further, the observation 2000 can include additional semantic information for the data 2008, such as the data detection time 2010 indicating when the data was obtained for the observation 2000. The data 2008 in this particular example may be a temperature value.

The protocol layer may indicate how to translate the observation 2000 or data included with the observation 2000 into a format that can be understood or interpreted by one or more particular things. For example, the protocol layer may indicate that for one particular thing, the detection time should be translated from a 24 hour clock to a 12 hour clock that distinguishes morning and afternoon by using am and pm. Further, the protocol layer may indicate that the observation 2000 should be transmitted to a particular thing using Bluetooth® or using one of the 802.11 wireless standards. In some such cases, the identification of the communication standard to use may result in the transmitting device (e.g., the heterogeneous communication gateway) selecting a particular antenna to transmit the observation 2000 or configuring particular internal elements of the heterogeneous communication gateway to enable transmission of the observation 2000 using particular communication protocols. For example, a particular signal path may be activated or deactivated based on the particular communication mechanism or protocol used to transmit the observation 2000 to the particular thing.

Additional Example Use Cases

In one example use case, a house may have a number of things that ca be connected to a network of things. For example, a house may include a smart thermostat, a smart doorbell, a smart refrigerator, a smart washer/dryer, an Internet-ready television, a cable internet modem, etc. Each of these things may be interconnected in a single network that can communication with an external network via a router. In some cases, this router may communication with the heterogeneous communication gateway. In other cases, the heterogeneous communication gateway can function as the router. Various characteristics of each of the things in the house can be monitored. For example, the connection speed for the cable internet modem can be monitored by an observer. If it is determined that the connection speed has dropped below a threshold, a service call can be automatically made to an Internet Service Provider to correct any faults in the service. Thus, in some cases, a repair can be made without, in some cases, the home owner or renter being aware that there was a problem with the service. As another example, if it is determined that a temperature in the refrigerator has risen above a threshold level, a service provider may be automatically contacted to repair the refrigerator.

In another example use case, a set of electronic locks may be installed at a set of tennis courts at a tennis club. A manager of the tennis club can enter appointment times into an appointment system along with a unique code for the users scheduled to play. This information may automatically be transmitted to the electronic locks. Thus, when a scheduled player scans an identification item (e.g., a security badge or a biometric marker) at the electronic lock, the court can unlock. If an unscheduled user attempts to access the court with an unrecognized identification item (e.g., an access badge), the court may remain locked.

In yet another example use case, a GPS sensor may monitor the location of a delivery vehicle. If an observer determines that the delivery vehicle has left an expected route or is spending longer than expected at a particular location, it may indicate that the driver is engaged in malicious activity (e.g., unauthorized selling of cargo). The observer may alert the reasoner, which can send an alert to a manager. Further, the driver may have security access enabling the driver to view his or her scheduled route, but not to see generated alerts. In contrast, the manager's security access may enable the manager to see both the routes and generated alerts.

In another example use case, a hospital may update particular life-support equipment with a newer model, or purchase newer models of the life-support equipment to supplement existing models. These updated or new models can automatically be integrated into the network of hospital equipment by accessing an updated protocol layer that includes semantic information for the equipment. Thus, a non-technical or non-network savvy user who may be responsible for maintaining the hospital's supply of equipment can integrate new equipment or updates to existing equipment without having an understanding of networks or software.

In yet another example use case, a farmer or rancher may tag his or her cattle with GPS locators and RFID tags. A heterogeneous communication gateway can scan the RFID tags and alert the rancher when the cows enter or exit the fenced yard. Further, a data processing engine can automatically secure the fenced yard upon an observer indicating that all of the registered cows are within the yard. Moreover, when new cows are added to the herd, they may be automatically registered for tracking purposes. For example, a newly tagged cow may enter the yard and be scanned by an RFID reader, which can communicate the ID of the cow to the heterogeneous communication gateway. The heterogeneous communication gateway can convert the data for transmission to the heterogeneous communication system. An observer at the heterogeneous communication system can determine that the ID of the cow is unrecognized and can trigger the reasoner or data processing engine 542 to add the new cow to the herd in the thing repository 554 or a repository at the entity environment of the rancher's cattle ranch or farm.

Further, the location of the cows can be monitored when the cows are outside of the fenced yard. The observer can use multiple location thresholds to determine whether to trigger a notification action by the data processing engine 542. For example, if one of the cows is outside of a first threshold (e.g., a few hundred yards) of a designated grazing area, the local ranch hand may be alerted. However, if the cow is determined to be beyond a second threshold (e.g., a mile) of the designated grazing area, the ranch owner may be alerted of the cow's location. As illustrated by the tagged cows of this example, things can include non-electronic objects that have been modified to provide data to other things (e.g., the rancher's cell phone) within a network of things.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A heterogeneous communication gateway comprising:
a plurality of communication devices within the heterogeneous communication gateway and including a first communication device and a second communication device, wherein at least one of the plurality of communication devices is implemented on a different circuit die from at least one other of the plurality of communication devices, and wherein the first communication device implements a different communication protocol than the second communication device;
a storage device storing a protocol layer, the protocol layer comprising a plurality of communication interfaces for interacting with a plurality of heterogeneous devices, the plurality of heterogeneous devices comprising a plurality of sensor devices; and
a hardware processor programmed to:
access an observation from a first sensor device at one of the first communication device or the second communication device, wherein the first sensor device is one of the plurality of sensor devices, wherein the first sensor device is used to measure one or more characteristics of a first entity environment, wherein at least some of the sensor devices are located at a second entity environment, and wherein the observation comprises a data item associated with a particular semantic;
determine a type of the first sensor device using the protocol layer;
determine semantic rules for the first sensor device based at least in part on the type of the first sensor device and the protocol layer;
translate the observation from a format associated with the type of the first sensor device to a format associated with an observer system based at least in part on the semantic rules for the first sensor device, the observer system implemented on computer hardware that is separate from the heterogeneous communication gateway; and
transmit the translated data to the observer system over a wide area network.

2. The heterogeneous communication gateway of claim 1, wherein the hardware processor is further programmed to translate the observation by:
identifying semantic rules for the observer system; and
translating the observation using at least the semantic rules for the observer system to the format associated with the observer system.

3. The heterogeneous communication gateway of claim 1, wherein the hardware processor is further programmed to:
receive a command from an actor to be performed at a configurable device, the configurable device included in the plurality of heterogeneous devices;
determine whether the actor is authorized to access the configurable device; and
in response to determining that the actor is not authorized to access the configurable device, preventing the command from being transmitted to the configurable device.

4. The heterogeneous communication gateway of claim 3, wherein the hardware processor is further programmed to determine whether the actor is authorized to access the configurable device by:
determining an entity associated with the actor;
determining whether the entity is authorized to access the configurable device; and
determining whether the actor is authorized to access the configurable device on behalf of the entity.

5. The heterogeneous communication gateway of claim 3, wherein, in response to determining that the actor is authorized to access the configurable device, the hardware processor is further programmed to
determine the type of the configurable device;
identify semantic rules for the configurable device based at least in part on the type of the configurable device;
format the command using the semantic rules for the configurable device; and
transmit the command to the configurable device.

6. The heterogeneous communication gateway of claim 3, wherein the actor comprises another configurable device from the plurality of heterogeneous devices.

7. A heterogeneous communication network comprising:
a plurality of heterogeneous devices comprising one or more processors executing instructions stored on one or more memories, at least some of the plurality of heterogeneous devices configured to communicate over a network, wherein a first device from the plurality of heterogeneous devices communicates using a first communication protocol and wherein a second device from the plurality of heterogeneous devices communicates using a second communication protocol differing from the first communication protocol;
a heterogeneous communication gateway comprising a first hardware processor and a plurality of communication devices within the heterogeneous communication gateway, a first communication device from the plurality of communication devices capable of communication using the first communication protocol and a second communication device from the plurality of communication devices capable of communication using the second communication protocol, wherein at least one of the plurality of communication devices is implemented on a different circuit die from at least one other of the plurality of communication devices, and wherein the first hardware processor is programmed to execute a protocol layer for enabling communication among heterogeneous devices, the protocol layer providing rules for converting observations accessed from the first device for consumption by the second device based at least in part on semantic rules included in the protocol layer for the first device; and a heterogeneous communication system comprising an observer system and a data processing engine, the observer system comprising one or more processors executing instructions stored on one or more memories, the observer system programmed to monitor one or more communications from at least some of the plurality of heterogeneous devices and the data processing engine comprising a second hardware processor programmed to initiate an action in response to a trigger generated by the observer system.

8. The heterogeneous communication network of claim 7, wherein the first hardware processor of the heterogeneous communication gateway is further configured to:
access an observation from the first device;
access a set of semantic rules of the second device from the protocol layer;
convert the observation from the first device for consumption by the second device using the set of semantic rules; and
provide the converted observation to the second device.

9. The heterogeneous communication network of claim 7, wherein the protocol layer is a dynamic protocol layer that is updateable without ceasing operation of the heterogeneous communication gateway.

10. The heterogeneous communication network of claim 7, wherein the protocol layer is modified at the heterogeneous communication system, wherein the heterogeneous communication system distributes the modified protocol layer to one or more heterogeneous communication gateways over a wide area network, and wherein the one or more heterogeneous communication gateways include the heterogeneous communication gateway.

11. The heterogeneous communication network of claim 7, wherein at least one of the plurality of heterogeneous devices comprises one or more sensors configured to measure one or more characteristics of an entity environment.

12. The heterogeneous communication network of claim 11, wherein the heterogeneous communication system further comprises a sensor network system programmed to aggregate observations received via a wide area network, at least some of the observations received from the one or more sensors.

13. The heterogeneous communication network of claim 12, wherein the observer system generates the trigger in response to determining that at least one observation aggregated by the sensor network system exceeds a threshold associated with the observation.

14. The heterogeneous communication network of claim 7, wherein, in response to the trigger, the data processing engine is further programmed to:
identify the action to execute in response to the trigger;
identify a device from the plurality of heterogeneous devices to receive a command to execute the action; and
transmit the command to the device.

15. The heterogeneous communication network of claim 14, wherein the data processing engine is further programmed to:
access a copy of the protocol layer stored at the heterogeneous communication system;
determine a set of semantic rules for the device from the copy of the protocol layer; and
format the command based at least in part on the set of semantic rules,
wherein the data processing engine transmits the command by transmitting the formatted command to the device.

16. The heterogeneous communication network of claim 14, wherein the data processing engine transmits the command to the device by transmitting the command to the heterogeneous communication gateway that transmits the command to the device.

17. The heterogeneous communication network of claim 16, wherein the heterogeneous communication gateway is further programmed to:
determine a set of semantic rules for the device from the protocol layer; and
format the command based at least in part on the set of semantic rules,
wherein the heterogeneous communication gateway transmits the command by transmitting the formatted command to the device.

18. The heterogeneous communication network of claim 7, wherein the heterogeneous communication gateway is one of a plurality of heterogeneous communication gateways, wherein at least some of the heterogeneous communication gateways communicate with a first set of heterogeneous devices from the plurality of heterogeneous devices, and at least some other of the heterogeneous communication gateways communicate with a second set of heterogeneous devices from the plurality of heterogeneous devices that differs from the first set of heterogeneous devices.

19. The heterogeneous communication network of claim 7, wherein the at least some of the heterogeneous communication gateways and the first set of heterogeneous devices are associated with a first entity environment, and the at least some other of the heterogeneous communication gateways and the second set of heterogeneous devices are associated with a second entity environment that differs from the first entity environment.

20. A heterogeneous communication gateway comprising:
a plurality of communication devices within the heterogeneous communication gateway and including a first communication device and a second communication device, wherein at least one of the plurality of communication devices is implemented on a different circuit die from at least one other of the plurality of communication devices, and wherein the first communication device implements a different communication protocol than the second communication device;
a storage device storing a protocol layer, the protocol layer comprising a plurality of communication interfaces for interacting with a plurality of heterogeneous devices; and
a hardware processor programmed to:
access data from a first device at one of the first communication device or the second communication device;
determine a type of the first device using the protocol layer;
determine semantic rules for the first device based at least in part on the type of the first device and the protocol layer;
translate the data from a format associated with the type of the first device to a format associated with an observer system based at least in part on the semantic rules for the first device using the protocol layer, the observer system implemented on computer hardware; and transmit the translated data to the observer system, wherein at least one of the observer system or the first device is located at a geographically different location than the heterogeneous communication gateway.

* * * * *